(12) United States Patent
Mendo et al.

(10) Patent No.: US 12,559,200 B2
(45) Date of Patent: Feb. 24, 2026

(54) COMMUNICATION METHODS IN A BICYCLE ELECTRONIC SYSTEM

(71) Applicant: CAMPAGNOLO S.R.L., Vicenza (IT)

(72) Inventors: Andrea Mendo, Marano Vicentino (IT); Federico Miglioranza, Schio (IT); Antonio Rizzo, Montagnana (IT)

(73) Assignee: Campagnolo S.R.L., Vicenza (IT)

( * ) Notice: Subject to any disclaimer, the term of this patent is extended or adjusted under 35 U.S.C. 154(b) by 403 days.

(21) Appl. No.: 18/183,098

(22) Filed: Mar. 13, 2023

(65) Prior Publication Data

US 2023/0303212 A1 Sep. 28, 2023

(30) Foreign Application Priority Data

Mar. 24, 2022 (IT) ........................ 102022000005801

(51) Int. Cl.
| | |
|---|---|
| B62M 25/08 | (2006.01) |
| B62J 45/20 | (2020.01) |
| B62J 50/22 | (2020.01) |

(52) U.S. Cl.
CPC .............. B62M 25/08 (2013.01); B62J 45/20 (2020.02); B62J 50/22 (2020.02)

(58) Field of Classification Search
CPC . B62M 25/08; B62J 45/00; B62J 45/20; B62J 50/22
See application file for complete search history.

(56) References Cited

U.S. PATENT DOCUMENTS

| | | | |
|---|---|---|---|
| 8,909,424 B2 | 12/2014 | Jordan et al. | |
| 9,227,697 B2 | 1/2016 | Matsumoto et al. | |
| 2017/0021897 A1* | 1/2017 | Bortolozzo | ............. B62J 50/22 |
| 2018/0121192 A1* | 5/2018 | Riedl | ........................ G06F 8/65 |
| 2018/0278535 A1 | 9/2018 | Kyou et al. | |

(Continued)

FOREIGN PATENT DOCUMENTS

| | | |
|---|---|---|
| CN | 106604212 B | 6/2020 |
| DE | 102015016602 A1 | 6/2017 |

OTHER PUBLICATIONS

Afonso, Jose A., "Mobile Sensing System for Cycling Power Output Control." In: Microelectronics, Electromagnetics and Telecommunications: Proceedings of ICMEET 2017. Sep. 4, 2016. Springer Netherlands. vol. 402, pp. 773-783, DOI: 10.1007/978-3-319-43671-5_65. . 10 pages.

(Continued)

*Primary Examiner* — Tuan H Nguyen
(74) *Attorney, Agent, or Firm* — Ipsilon USA—NLO

(57) ABSTRACT

A bicycle-implemented transmission method is applied in a transmitter electronic component of a bicycle electronic system. The system includes at least one receiver electronic component, each system component having zero or more pieces of information attributable thereto and candidate to communication within the system. Each of the attributable pieces of information includes an identifier which is unique in the bicycle electronic system. According to the method, basic-payloads, each containing at least the unique identifier of a respective one of the attributable pieces of information, are formed and grouped together in a payload. The payload is then sent to the at least one receiver electronic component as value of a characteristic of a Bluetooth Low Energy (BLE) service.

18 Claims, 15 Drawing Sheets

(56)　　　　References Cited

U.S. PATENT DOCUMENTS

| | | |
|---|---|---|
| 2018/0278726 A1 | 9/2018 | Kyou |
| 2020/0252987 A1 | 8/2020 | Inoue et al. |
| 2021/0083764 A1 | 3/2021 | Junk et al. |

OTHER PUBLICATIONS

Italian Search Report issued for Italian Application No. 102022000005801 filed on Mar. 24, 2022 on behalf of Campagnolo S.R.L.. Mail Date: Nov. 9, 2022. 8 Pages.

Italian Search Report issued for Italian Application No. 102022000005813 filed on Mar. 24, 2022 on behalf of Campagnolo S.R.L.. Mail Date: Nov. 12, 2022. 2 Pages.

Italian Search Report issued for Italian Application No. 102022000005816 filed on Mar. 24, 2022 on behalf of Campagnolo S.R.L.. Mail Date: Nov. 11, 2022. 3 Pages.

Italian Search Report issued for Italian Application No. 102022000005822 filed on Mar. 24. 2022 on behalf of Campagnolo S.R.L.. Mail Date: Nov. 8, 2022. 3 Pages.

Letourneau, A. "Bluetooth Low Energy Serial: A Valid Design Strategy?" Punch Through. Dec. 3, 2019. 11 pages.

Mikhaylov, K. et al., "Multihop Data Transfer Service for Bluetooth Low Energy." 13th International Conference on ITS Telecommunications (ITST) Nov. 5, 2013. pp. 319-324. 6 pages.

Written Opinion issued for Italian Application No. 102022000005801 filed on Mar. 24, 2022 on behalf of Campagnolo S.R.L.. Mail Date: Nov. 9, 2022. 6 Pages.

Written Opinion issued for Italian Application No. 102022000005813 filed on Mar. 24, 2022 on behalf of Campagnolo S.R.L.. Mail Date: Nov. 12, 2022. 6 Pages.

Written Opinion issued for Italian Application No. 102022000005816 filed on Mar. 24, 2022 on behalf of Campagnolo S.R.L.. Mail Date: Nov. 11, 2022. 8 Pages.

Written Opinion issued for Italian Application No. 102022000005822 filed on Mar. 24, 2022 on behalf of Campagnolo S.R.L.. Mail Date: Nov. 9, 2022. 7 Pages.

* cited by examiner

FIG. 9

GATT server (130)

| | | Handle (121) | Type (UUID) (122) | Value (123) | Permissions (124) |
|---|---|---|---|---|---|
| Battery service (SIG) (131) | Declaration | N | Service (0x2800) | 0x180F | R (140) |
| Characteristic Battery Level (133) | Declaration | N+1 | Char (0x2803) | R\|NOTI N+2 \| 0x2A19 | R (141) |
| | Value | N+2 | 0x2A19 | battery level [%], e.g. 35% | R (142) |
| | Descriptor | N+3 | CCCD (0x2902) | Notification Enabled(0x0001) | R/W (143) |
| Acceleration/Wake service (private) (132) | Declaration | N+4 | Service (0x2800) | SAcc (UUID-128b) | R (144) |
| Characteristic Acceleration X (134) | Declaration | N+5 | Char (0x2803) | R\|NOTI \| N+6 \| CAccX | R (145) |
| | Value | N+6 | CAccX (UUID-128b) | Acc. X [G](e.g. 1.257 G) | R (146) |
| | Descriptor | N+7 | CCCD (0x2902) | NONE (0x0000) | R/W (147) |
| Characteristic Wake Threshold X (135) | Declaration | N+8 | Char (0x2803) | R\|W \| N+9 \| CWakeX | R (148) |
| | Value | N+9 | CWakeX (UUID-128b) | Acc. X Thr. [G] (e.g. 1.100 G) | R/W (149) |
| Characteristic Acceleration Y (136) | Declaration | N+10 | Char (0x2803) | R\|NOTI \| N+11 \| CAccY | R |
| | Value | N+11 | CAccY (UUID-128b) | Acc. Y [G] | R |
| | Descriptor | N+12 | CCCD (0x2902) | NONE (0x0000) | R/W |
| Characteristic Wake Threshold Y (137) | Declaration | N+13 | Char (0x2803) | R\|W \| N+14 \| CWakeY | R |
| | Value | N+14 | CWakeY (UUID-128b) | Acc. Y Thr. [G] | R/W |
| Characteristic Acceleration Z (138) | Declaration | N+15 | Char (0x2803) | R\|NOTI \| N+16 \| CAccZ | R |
| | Value | N+16 | CAccZ (UUID-128b) | Acc. Z [G] | R |
| | Descriptor | N+17 | CCCD (0x2902) | NONE (0x0000) | R/W |
| Characteristic Wake Threshold Z (139) | Declaration | N+18 | Char (0x2803) | R\|W \| N+19 \| CWakeZ | R |
| | Value | N+19 | CWakeZ (UUID-128b) | Acc. Z Thr. [G] | R/W |

COMMUNICATION METHODS IN A BICYCLE ELECTRONIC SYSTEM

CROSS-REFERENCE TO RELATED APPLICATIONS

The present application claims priority to Italian patent application No. 102022000005801 filed on Mar. 24, 2022, the contents of which are incorporated herein by reference in their entirety.

FIELD

The subject-matter disclosed herein relates in general to communication methods in a bicycle electronic system. In the present description and in the attached claims, term "communication" is broadly meant to encompass transmission, reception and transception, namely to encompass uni-directional communication and bidirectional communication, unless otherwise specified.

The subject-matter disclosed herein also relates to a bicycle electronic component, a bicycle electronic system, a computer program and a computer readable medium, related to said methods.

In particular, the subject-matter disclosed herein relates to said aspects in a bicycle electronic system wherein at least one Bluetooth Low Energy®, in short BLE hereinbelow, wireless network is formed among at least some of the system components.

BACKGROUND

Modern bicycles are sometimes provided with one or more pieces of equipment or electronic devices specific for cycling. In the present description and in the attached claims, the expression "electronic device" is broadly used, to encompass electronic and/or electromechanical and/or electro-hydraulic and/or electro-pneumatic devices.

Also general-purpose electronic devices may be configured to interact with cycling specific electronic devices. In the present description and in the attached claims, under the expression "bicycle electronic system" the assembly of cycling specific devices or pieces of equipment and general-purpose devices configured to interact with cycling specific devices are meant to be indicated, which in the present description and in the attached claims are collectively called "electronic devices" or "system components", briefly also just "components" or "devices".

In a bicycle electronic system, information, commands and in general the data which need to be exchanged among system components may be several; besides a large amount of data, also the accuracy of communication and/or the transmission speed should sometimes be very high, especially in the case of commands which may influence the cyclist safety, such as, merely as an example, speed gear shifting commands or data relating to the cyclist's health.

There is a trend, in bicycle electronic systems, to use wireless communication at least among some of the system components.

Some known bicycle electronic systems make use, for wireless communication among system components, of the Bluetooth Low Energy® technology. BLE is a technical standard of communication for wireless networks, with low energy consumption, provided, in particular, for small, discrete data transfers, for example status information of a sensor, the current time of a clock etc.

SUMMARY

As the complexity of the bicycle electronic system and therefore the amount of data that needs to be communicated in the system grows, a conventional use of BLE may turn out to be not very flexible, and not totally adequate.

The technical problem at the basis of the subject-matter disclosed herein is to obviate said drawbacks, providing for communication (transmission and/or reception) methods in a bicycle electronic system, as well as bicycle electronic components, bicycle electronic systems, computer programs, and computer readable means related to said methods.

In an aspect, the subject-matter disclosed herein is defined in the independent claims. Preferred features are indicated in the dependent claims.

BRIEF DESCRIPTION OF THE DRAWINGS

Further features and advantages of the subject-matter disclosed herein will become clearer from the following detailed description of some preferred embodiments thereof, made with reference to the attached drawings, wherein.

DESCRIPTION OF EMBODIMENTS

Bicycle System

Figure 1:
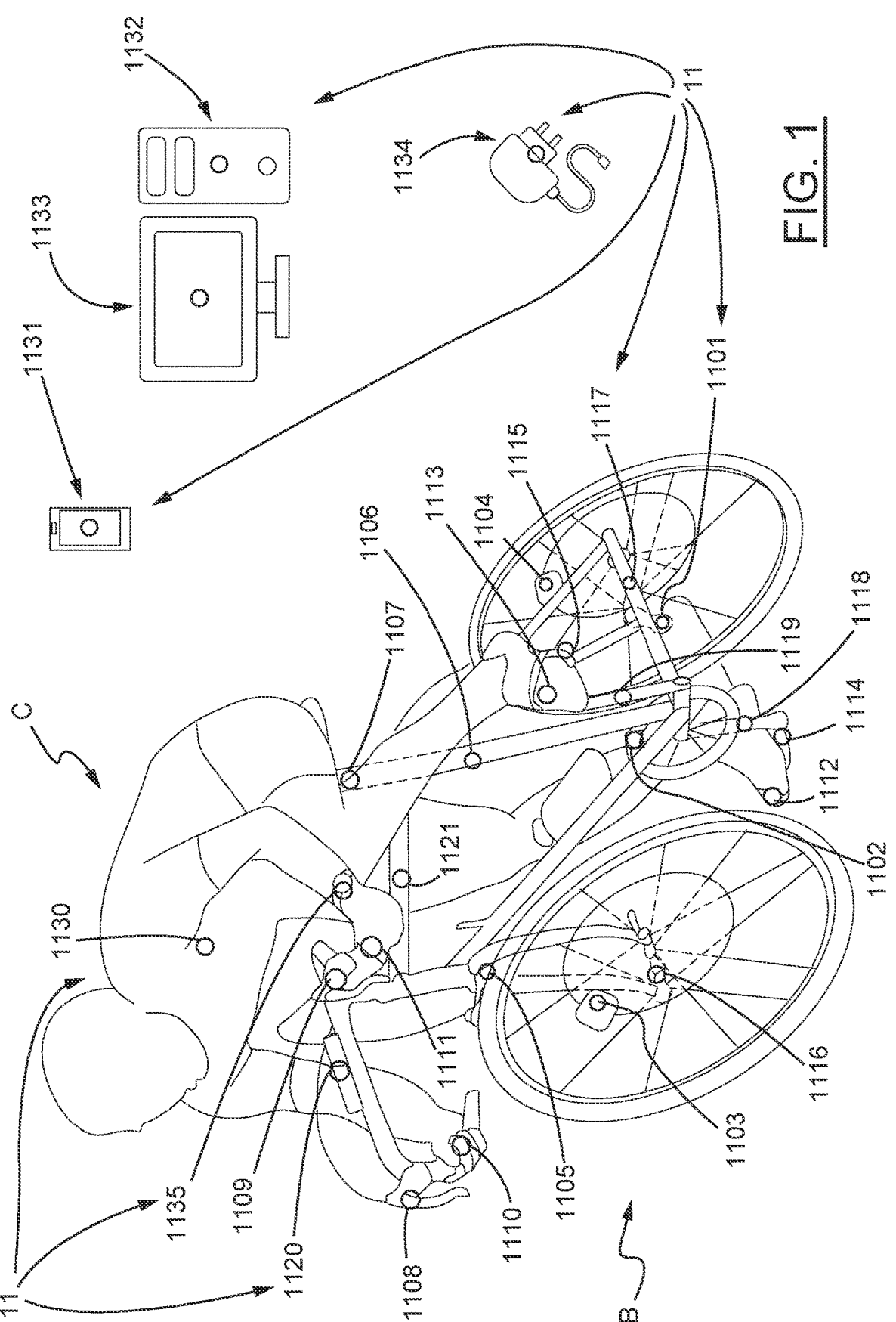
FIG. 1 shows a bicycle electronic system.

With reference to FIG. 1, a bicycle electronic system 10 according to the subject-matter disclosed herein comprises a plurality of components 11 comprising at least two components, preferably at least three components, and even more preferably more than three components. In FIG. 1 an arbitrary number of components 11 is shown, in a totally schematic manner, and reference numeral 11 is only associated with some of the components for the sake of clarity.

Some pieces of equipment of the bicycle B are identifiable, such as a gearshift system, typically comprising a rear derailleur assembly 1101 associated with the hub of the rear wheel and possibly a derailleur assembly 1102 associated with the bottom bracket spindle, a brake 1103 associated with the front wheel, a brake 1104 associated with the rear wheel, a front suspension or shock absorber 1105, a rear suspension or shock absorber 1106, a saddle setting adjuster 1107; one or more manual control devices 1108, 1109, 1110, 1111 (the latter being of the wearable type) intended for controlling those devices or pieces of equipment, in particular for controlling the derailleur assemblies 1101, 1102; some detector devices of the conditions of the path and/or of the cyclist C such as for example a heart rate monitor 1130 and the devices 1112-1119 shown at the shoes, at the pedals, at the wheel hubs, at the crankarms, which may comprise for example an accelerometer, a cadence sensor, a pedaling sensor; a cycle-computer 1120 which may include for example a GPS, an altimeter, a clinometer, etc.; a possible central controller 1121 intended for automatically or semi-automatically controlling the above mentioned devices or pieces of equipment; a smartphone 1131, a tablet 1132, a computer 1133, a battery charger 1134, a smartwatch 1135. Term "manual" will be sometimes omitted hereinbelow for brevity. The components of the bicycle electronic system 10 may include still other devices, merely by way of example an illumination system, an anti-theft device, smart watches, etc.

It is understood that some components 11 of the system 10 are cycling specific electronic devices (for example 1101-1120), while some components 11 are general-purpose electronic devices (for example 1130-1135, but also general-purpose satellite navigators, altimeters, clinometers, accelerometers etc.), which may be configured to interact with one or more of the cycling specific electronic devices 1101-1120.

From another point of view, it is understood that among the components 11 of the system 10, some are electronic devices mechanically connected to the bicycle B, in a fixed, stable or removable manner; some are electronic devices carried by the cyclist C (for example, 1110-1113, 1130, 1135); some (for example 1132-1134) are electronic devices provided for interacting with the other components of the bicycle electronic system 10 while the bicycle B is stationary and not in use.

The latter may include for example electronic devices carried by the cyclist C but in the switched off or standby state, or in any case not actively used by the cyclist while riding the bicycle; electronic devices left in the garage, for example the battery charger 1134 or the computer 1133 or tablet 1132 wherein travel data is to be downloaded or from which to download updates for the other components 11 of the system 10; electronic devices of a machine shop, a dealer, a tester, etc.; electronic devices carried on board of a flagcar following the cyclist, or by a travel companion, etc.

In general, it is necessary or advisable for one or more of the components 11 of the system 10 to interact with one or more of the other components 11 of the system 10.

For this purpose, at least some of the components 11 of the system 10 are connected, at least temporarily, in one or more communication networks. In the present description and in the attached claims, under term "communication network" or briefly "network", a set of electronic devices, also called "nodes", are generally meant to be indicated, which are physically connected—stably or temporarily, as well as with a wired link or with a wireless link—so that each node of the set is able to exchange information directly or indirectly with each other node of the set; the link between only two devices or nodes is meant to be encompassed; it is not necessarily meant that the logical topology coincides with the physical topology and/or that the communication protocol among devices or nodes of the network is a single one; a specific subset of a network (namely, a sub-network) as defined above may also be meant. In the present description and in the attached claims, under term "physical topology", the physical arrangement of the devices and of the transmission media or links is meant to be indicated; under term "logical topology", the manner in which the network components accede to the transmission medium to send data is meant to be indicated. In the present description and in the attached claims, term "connection" is used to indicate a link on which communication may take place.

Not all the components 11 of the system 10 are necessarily always present, always switched on and/or always network connected. Each of the links and each of the network connections may be permanent or temporary. In general, dynamic network(s) is/are thus dealt with.

The physical topology of the network among the components 11 of the system 10 may in general be whatever one, and may in general support one or more logical networks of several topologies.

The communication among components 11 of the system 10 takes place according to at least one network protocol. In the present description and in the attached claims, under "network protocol" a set of rules formally described is meant to be indicated, which define the communication modalities among two or more components 11. In general, the network protocol is defined by one or more data structures and by one or more communication methods, in particular by one or more transmission methods and by one or more reception methods.

At least two of the components 11 of the system 10 comprise a respective data processing system, herein also briefly called processor, one adapted to carry out the steps of one of the transmission methods described hereinbelow, and the other adapted to carry out the steps of one of the reception methods described hereinbelow. At least one of the processors may be adapted to carry out both the steps of one of the transmission methods described hereinbelow and the steps of one of the reception methods described hereinbelow. At least one of the processors may be adapted to carry out the steps of one of the communication methods described hereinbelow.

Additionally, the processor of one or more components 11 may be adapted to carry out one or more methods related to the specific operation of the involved component 11 and/or of one or more other system components 10. Merely by way of example, a derailleur assembly 1101, 1102 may be programmed to move a chain guide thereof, a crankarm 1118, 1119 may be programmed to compute a pedaling power, etc.

At least one of the components 11 of the system 10 comprises computer readable storage means, wherein data is stored according to one or more of the data structures described hereinbelow and/or instructions which, when executed by the processor, cause one or more of said communication/transmission/reception methods and/or one or more of said methods related to the specific operation to be executed.

For the sake of brevity, hereinbelow in general expression "program" or "programmed component" or derived forms will be used, and expressions "communication program" and "specific program" will be used where it is desired to distinguish among the two mentioned classes of methods.

The physical topology of the communication network formed in the bicycle electronic system 10 may be, at least in principle, whatever, for example it may be selected among: ring, mesh, star, fully connected, linear daisy-chain, tree, bus, hybrid.

The logical topology may be, at least in principle, whatever, for example it may be selected among: ring, mesh, star, fully connected, linear daisy-chain, tree, bus, hybrid. The logical topology may be selected independently of the physical topology as long as it is fully supported by the latter.

The selection of a specific physical topology and/or of a specific logical topology based on the components 11 of the system 10 is within the skills of those skilled in the art, also in the light of the present description.

At least one network connection among at least some of the components 11 of the system 10 may be a connection according to the Bluetooth® Low Energy standards, briefly called hereinbelow "BLE connection". At least two components 11 of the system 10 are in that case for example provided with at least one respective "BLE module", term under which in the present description and in the attached claims, the hardware and firmware (the assembly of circuitry, possible antenna and suitably programmed controller) providing the necessary functionalities required to implement the BLE standard is meant to be indicated, whether they are provided in a dedicated device or chip or integrated in a device or chip or operating system also in charge of other functions.

It may also be provided for at least one network connection among components 11 of the system 10 to be of a wireless type other than BLE, briefly non-BLE connection. At least two components 11 of the system 10 are in that case provided with at least one respective wireless module other than a BLE module.

Irrespective of whether there are wireless BLE and/or non-BLE connections or not, it may also be provided for at least one network link among components 11 of the system 10 to be of the wired type, a term used in the present description and in the attached claims as opposed to term wireless, without necessarily implying the presence of a cable, and rather encompassing a direct contact between conjugated contacts of the connected components. In this case, at least two components 11 of the system 10 are provided with at least one respective wired interface.

One or more of the possible wired network links may be suitable for serial communication. At least two components 11 of the system 10 are provided in that case with at least one respective serial interface. In the present description and in the attached claims, under the expression "serial communication", a communication is meant to be indicated, wherein the bits are transmitted one at a time along a communication channel, and are sequentially received, in the same order. Merely by way of non-limiting example, the well-known serial protocols UART, SPI, I2C, Can-bus etc. are mentioned.

It should be noted that one and a same component 11 may be involved both in a wireless, in particular BLE, link, and in a wired, in particular serial, link, and thus may have both at least one wireless module, in particular a BLE module, and at least one wired interface, in particular at least one serial interface.

As mentioned, at least one component 11 may be provided with more than one wireless module, for example more than one BLE module, and/or with more than one wired interface, for example more than one serial interface, which said at least one component 11 uses for more than one connection with one or more different components 11. In the case of two connections with a same component 11, one may be used for transmission and the other may be used for reception, so as to achieve an overall bidirectional communication still using each link for a unidirectional communication. In the case of two (or more) connections with two (or more) different components 11, each may be used for transmission, for reception or for bidirectional communications, so that said component provided with the two or more connections may for example transmit to a second component and receive from a third component, or transmit to a second component and bidirectionally communicate with a third component, and in general unidirectionally and/or bidirectionally communicate with more than two components. In the case of two connections with two different components 11, these may be part of the same logical network or not.

In the case wherein a component 11 is part of two (or more) different logical networks, it may play an interface role among the two (or more) logical networks, whether they are homogeneous or heterogeneous. In the present description and in the attached claims, under the expression "homogeneous network", networks having a same network architecture are meant to be indicated, while under the expression "heterogeneous networks", networks which network architecture differs in at least one protocol layer are meant to be indicated.

As discussed above, the bicycle system 10 may be even very complex, having an even very large number of components 11, several networks (or sub-networks) having the same or different physical topology(ies) and the same or different logical topology(ies), and supporting an even quite large number of different communication protocols.

Illustrative Configuration of the Bicycle Electronic System

Figure 2:
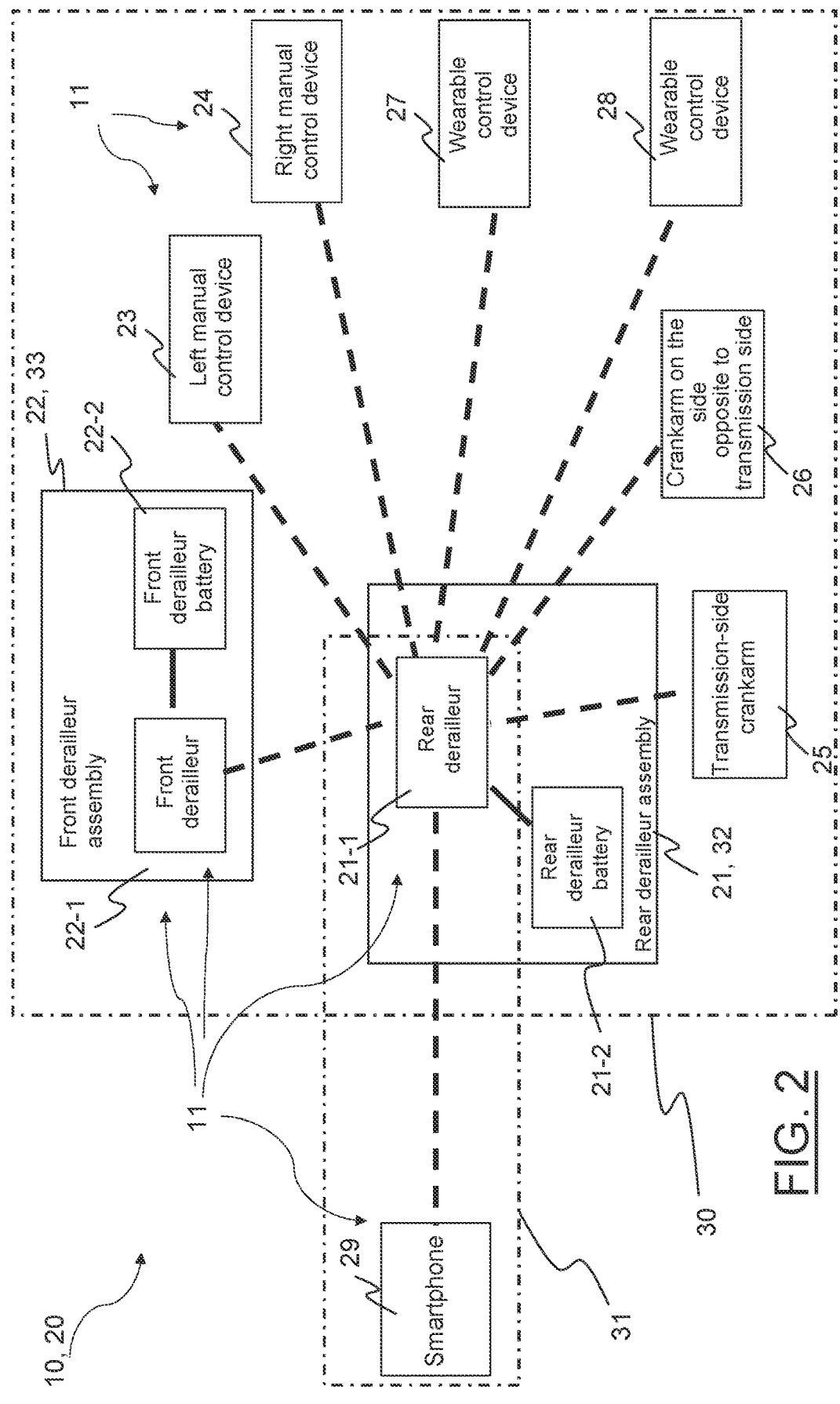
FIG. 2 shows a block diagram of an illustrative bicycle electronic system.

Without detracting from generality and only for the purpose of a greater clarity of presentation, two communication protocols are described hereinbelow with reference to a merely illustrative configuration of the bicycle system 10, shown in FIG. 2 and described hereinbelow.

The illustrative bicycle electronic system 20 comprises several components 11 (also in this case, reference numeral 11 is associated only to some of the components shown, for greater clarity): a rear derailleur assembly 21, a front derailleur assembly 22, a right manual control device 23, a left manual control device 24, an instrumented crankarm 25 on the transmission side, an instrumented crankarm 26 on the side opposite to the transmission side, a pair of wearable control devices 27, 28, and a smartphone 29.

It is noted that the smartphone 29 is merely illustrative of a general-purpose device, in particular provided with a graphical user interface, while the other ones are cycling specific electronic devices. The smartphone 29 is configured to interact with the cycling specific electronic devices 21-28. It is emphasized that there could be more than one single general-purpose device. Each control device 23, 27; 24, 28 is programmed, in a manner per se well known and which details lie outside of the subject-matter disclosed herein, to emit one or more output(s) based on the interaction by the cyclist with one or more members like levers, push-buttons, etc., based on which outputs the gear ratio of the bicycle B is changed.

Each instrumented crankarm 25, 26 is programmed, in a manner per se well known and which details lie outside of the subject-matter disclosed herein, to emit one or more output(s) based on one or more sensors, for example measurements of applied torque and/or pedaling cadence and/or pedaling power.

Each derailleur assembly 21, 22 is programmed, in a manner per se well known and which details lie outside of the subject-matter disclosed herein, to displace the transmission chain among toothed wheels of a set of toothed wheels respectively associated with the rear wheel and with the bottom bracket assembly, so as to change the gear ratio. Program inputs comprise one or more of the outputs of the devices 23-28 (and of any other components of the bicycle electronic system 10 in case it differs from the illustrative system 20). Furthermore, the derailleur assemblies 21, 22 may exchange data with each other, in particular the respective engaged toothed wheel.

As those skilled in the art will understand, the smartphone 29 may collect data from the other components 11 of the system 20 (the cycling specific electronic devices 21-28) for display to a user, storage for historical collection, for statistics purposes, for sharing with other applications relating to health, etc.

The smartphone 29 may also provide an input to the other components 21-28 of the system 20, for example values of the parameters of the respective specific programs. In the present description and in the attached claims, term "parameter" is used to indicate a variable of one or more program instructions, which value is input to the program (or to a specific function or operation thereof) before the execution of such instruction(s). Merely by way of example, a control device 23, 24, 27, 28 may emit different commands according to whether a push-button thereof is pressed for a shorter or longer time than a threshold parameter; the value of the threshold parameter may be stored in a memory location of the control device 23, 24, 27, 28, and that value may be settable through the smartphone 29. Still merely by way of example, the smartphone 29 may provide to the specific program of either derailleur assembly 21, 22 data which intervenes in the determination of the gear ratio to be set, for example speed data obtained by an accelerometer or by a geolocation system internal to the smartphone 29 or collected from other general-purpose electronic devices, from Internet etc.

Those skilled in the art will understand that each of the components 11 of the bicycle electronic system 10, also in case the latter differs from the illustrative system 20, may in general be programmed to receive inputs and/or to provide outputs within the system 10.

The components 21-29 of the illustrative bicycle electronic system 20 are connected in a network having hybrid physical topology, of which they form respective nodes.

All the above-mentioned cycling specific electronic devices 21-28 are connected in a network called herein "cycling network" 30 for the sake of convenience, for exchanging, among other things, the above-mentioned input and output.

The smartphone 29 is connected, at least temporarily, in a network called herein "interacting network" 31 for the sake of convenience, which in the case shown is formed with the rear derailleur assembly 21.

The cycling network 30 has, in the illustrative case shown, a star logical topology.

The cycling network 30 is, in the case of the illustrative system 20, a wireless network, in particular a BLE network better described hereinbelow. The connections of the network 30 are shown with a dashed line.

In the illustrative case shown, the rear derailleur assembly 21 plays the role of star center, and the other components 22-28 play the role of peripheral nodes.

The interacting network 31 is, in the case of the illustrative system 20, a wireless network, in particular a BLE network better described hereinbelow. The connections of the network 31 are shown with a dashed line.

As emphasized above, not all the components 11 of the system 10 are necessarily always present, always switched on and/or always network connected. For the purposes of the following illustrative description, it will be assumed that the components 21-28 are present, switched on and connected, and that the smartphone 29 may or may not be present, switched on and connected.

In the illustrative bicycle system 20, each of the derailleur assemblies 21, 22 has a smart battery 21-2, 22-2, namely a power supply unit with its own processor or data processing system in charge of control thereof. As is well known, a "smart battery" comprises a battery of secondary cells, for example of the lithium polymer type, and an integrated management system of the battery of secondary cells, which for example embodies a recharge circuit and advanced diagnostics systems which comprise the processor, typically borne by an electronic board or PCB (Printed Circuit Board).

In general, the smart battery 21-2, 22-2 represents a respective network node, and falls in general within term "component", as used in the present description and in the attached claims. Thus, in general, each smart battery 21-2, 22-2 is a component 11 of the bicycle electronic system 10 (20).

In the present description and in the attached claims, when the derailleur assembly 21, 22 or the derailleur is broadly referred to, it is meant to encompass the respective smart battery 21-2, 22-2; when it is proper to refer to the individual network nodes, then the derailleur 21-2, 22-1 (namely, the "true" derailleur) and/or the smart-battery 21-2, 22-2 are referred to.

The components 23-28 are powered by one or more battery power supplies, for example by a respective button battery. The smartphone 29 may be powered in any conventional manner.

Each smart battery 21-2, 22-2 has a wired physical link with the respective derailleur 21-1, 22-1, represented by the contact of the respective electric contacts. Derailleur 21-1, 22-1 and respective smart battery 21-2; 22-2 form, respectively, two wired networks 32, 33 (each coinciding with a derailleur assembly 21, 22). The connections of the two networks 32, 33 are shown in solid line.

Comparatively Higher Sub-Level of the Application Level of the Network Architecture (Upper Protocol)

Figure 3:
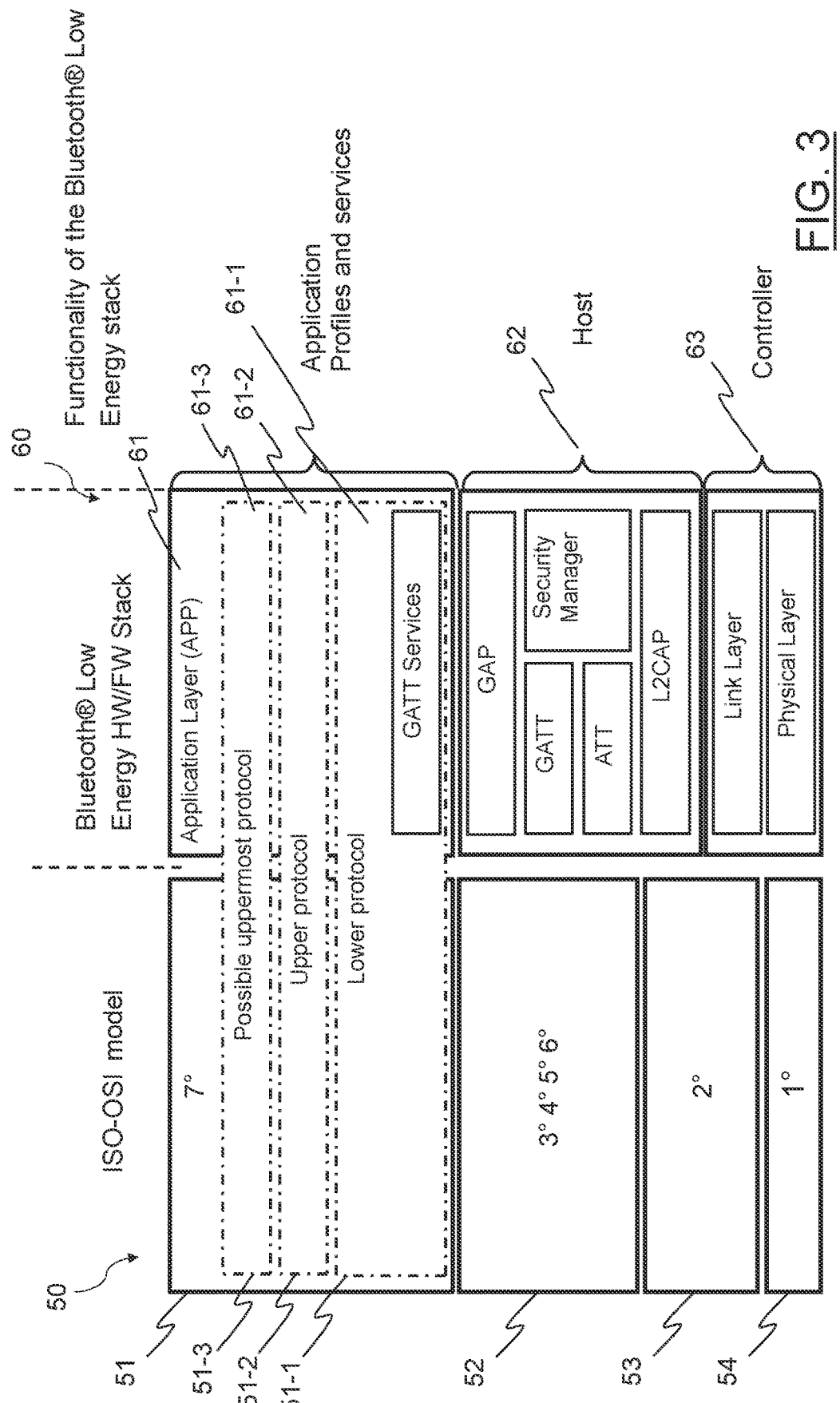
FIG. 3 schematically shows network architectures and related levels and sub-levels, FIG. 4 schematically shows a data structure of a first protocol, FIG. 5 schematically shows a payload format of a packet of the first protocol, FIG. 6 schematically shows a communication packet format, FIG. 7 schematically shows BLE components and their interactions, FIG. 8 schematically shows a BLE Characteristic, FIG. 9 schematically shows a conventional, illustrative GATT server, FIG. 10 schematically shows a conventional BLE packet, FIG. 11 schematically shows the illustrative bicycle electronic system of FIG. 2 in greater detail, FIG. 12 schematically shows an illustrative GATT server, and FIGS. 13-18 schematically show illustrative data flows in a bicycle electronic system.

With reference also to FIG. 3, a protocol for a bicycle electronic system 10, on which some communication (transmission and/or reception) methods, as well as other related aspects of the subject-matter disclosed herein, are based, is defined herein in a sub-level 51-2 of the Application level 51 (7th level) of the well-known Open Systems Interconnection model (OSI) of the International Organization for Standardization (ISO), or ISO/OSI model 50, or in any case in a sub-level of the uppermost level of the network architecture, for example in a sub-level 61-2 of the Application level 61 of the BLE standard or BLE architecture 60 or BLE HW/FW stack.

In order to distinguish it from a protocol, defined in an underlying level 51-1 of the Application level 51 of the ISO/OSI model 50, or in any case in an underlying sub-level of the uppermost level of the network architecture, for example in a sub-level 61-1 of said Application level 61 of the BLE standard 60, the protocol 50 will be sometimes called herein, for the sake of brevity, "Upper protocol", and the other protocol will be sometimes called herein, for the sake brevity, "Lower protocol".

It is noted that there may be also a third sub-level 51-3 of the Application level 51 of the ISO/OSI model 50, or a third sub-level 61-3 of the Application level 60 of the BLE standard 60, or a third sub-level of the uppermost level of the network architecture, still higher than said sub-level (51-2, 61-2) of the Upper protocol. For example, the specific programs of a component 11 like those described above may represent an example of an application program in the third sub-level, in case they are totally distinct from programs implementing the Upper protocol. It is however noted that the Upper protocol may also be implemented, at least in part, in said specific programs of a component 11.

Specifically, the Upper protocol is a portion of application software that defines a unique format for data exchange, shared among the components 11 of the bicycle electronic system 10, which specifies how the data to be transmitted should be encoded, and how the received data should be interpreted, regardless of what happens in the lower levels of the OSI model 50 (from the 6th to the 3rd levels: Presentation, Session, Transport, Network, overall indicated with reference numeral 52; 2nd level 53 Data link; 1st level 54 Physical), and in the corresponding Host 62 and Controller 63 layers of the BLE architecture 60. In the present description and in the attached claims, "unique format" indicates a format which may be interpreted in one way only, and may thus not cause any ambiguity.

It is emphasized that BLE, in its own Application level 61, provides for the GATT services, better described hereinbelow, without providing for plural sub-levels; in other words, in a conventional implementation according to the BLE standard, it is only a matter of configuring the GATT services according to the application.

Such Upper protocol provides for a data structure (or data format) described hereinbelow with reference to FIG. 4 and a payload format of a packet communicated in the network, or electronic message, described hereinbelow with reference to FIG. 5.

All the properties or pieces of information attributable to each component 11 of the cycling network 30 of the illustrative bicycle electronic system 20 (besides possibly to one or more components of the interacting network 31) and candidate to communication in the system 10—and thus all the pieces of information attributable to a component 11 which is desired to "expose" in the network—are stored according to such data structure.

In the present description and in the attached claims, the expression "attributable piece of information" is sometimes replaced by term "property" or by term "feature" or by term "InfoTag".

In general, although this is not always necessary, each component 11 stores in a memory thereof its own—zero or more—attributable piece(s) of information.

The components 11 of the bicycle system 10 may know a priori which are all or some (a single one included) of the attributable piece(s) of information of one or more of the other components 11 of the bicycle system 10, or of all the components 11.

Alternatively or additionally, the components 11 of the bicycle system 10 learn which are all or some (a single one included) of the attributable piece(s) of information of one or more of the other components 11 of the bicycle system 10, or of all the components 11, during the establishment of the network, subsequently or immediately after the establishment, or, still, in an update phase, in a suitable manner which lies outside of the subject-matter disclosed herein—although hereinbelow a specific manner is mentioned.

A component 11 of the bicycle electronic system 10 may store an integral or partial copy of the attributable pieces of information of one or more of, or all, the other components 11 of the system 10.

The Upper protocol thus defines a database of attributable pieces of information of the various components 11 of the bicycle electronic system 10; the database is, in general, stored in a distributed form in the system 10, wherein each component 11 may store a partial or integral part of the database.

The attributable pieces of information of the various components 11 of the bicycle electronic system 10 are communicated in the system 10 according to the payload defined by the Upper protocol.

The "attributable pieces of information" may include, but are not limited to, parameters, variables and constants of the specific program of the component 11; status variables of the component 11; measurements taken by the component 11; identification data of the component 11 and/or of its specific program like names, addresses, software/firmware versions etc.

The "attributable pieces of information" may furthermore include auxiliary pieces of information, used during the communication of instructions, in the manner better specified hereinbelow.

Data Structure

Figures 4, 5, 6:
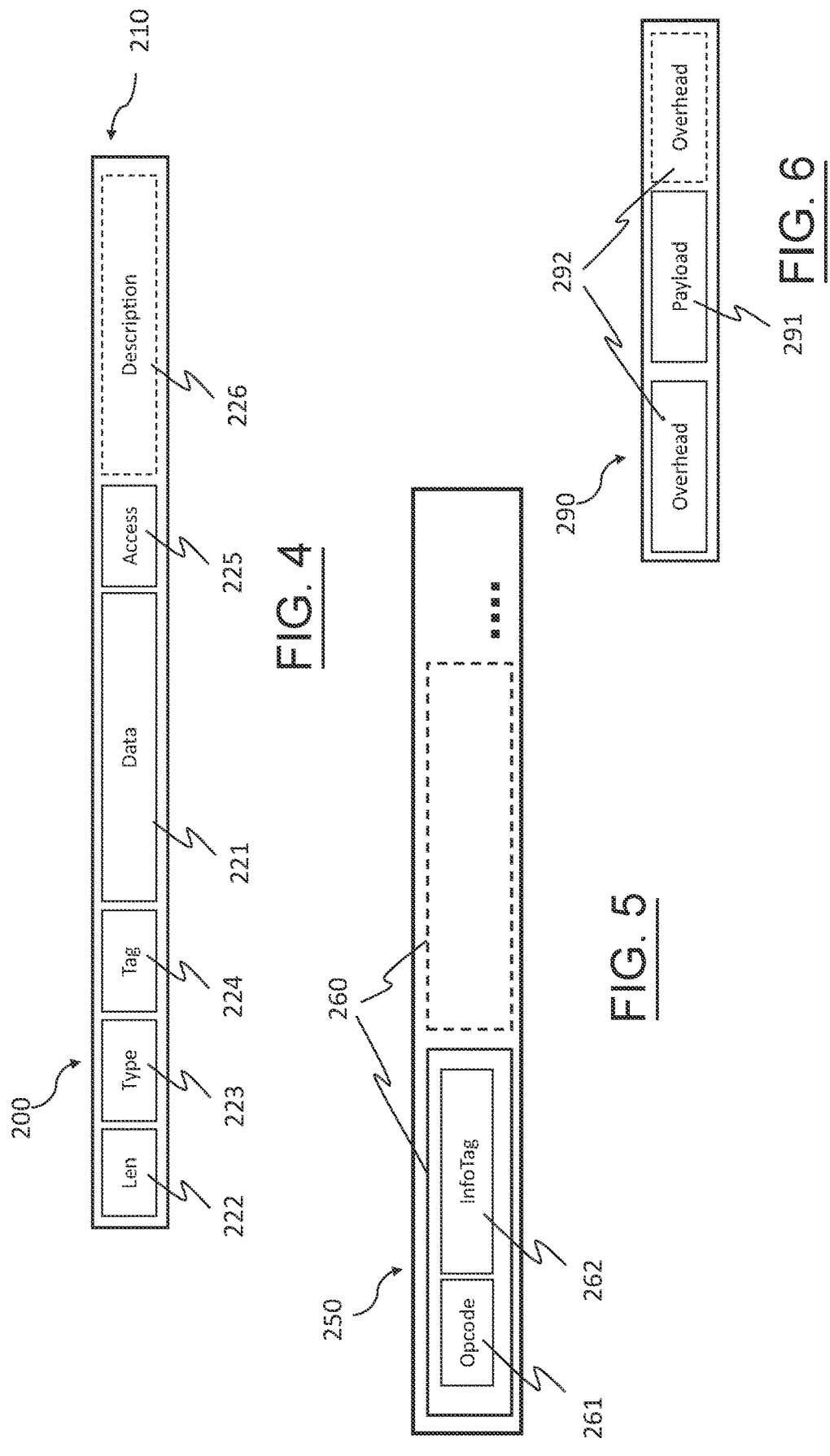

With reference to FIG. 4, the data structure 200 is now described, according to which the attributable pieces of information or InfoTags are stored according to the Upper protocol.

The data structure 200 is of the record type. Each attributable piece of information or InfoTag 210 is, thus, a record of the database defined by the Upper protocol.

Field 221 comprises the value, Data, of the attributable piece of information 210.

Field 222 comprises the length, Len, of field Data 221. Alternatively, it may express the length of the InfoTag 210 or of its portion which is communicated in the system 10.

Field 223, completely optional, comprises an identifier of data type, Type, which identifies the type of the datum of field Data 221. Data are typified in a standard format or in a proprietary format. Merely by way of non-limiting example, the data may be of the Boolean, string, integer—or 8-bit integer, 16-bit integer etc.—, floating point type, of the type temperature, date-time, date-hour-minutes, time duration, linear measurement type . . . , software version, string, electric voltage, electric current etc.

The data type identifier may also encode the unit of measurement. Merely by way of non-limiting example, a temperature in Celsius degrees and a temperature in Fahrenheit degrees may be encoded with different identifiers, as well as a linear measurement in millimeters and a linear measurement in micron may be encoded with different identifiers. Alternatively, the unit of measurement may be expressed in a specific field, not shown.

Field 224 comprises an identifier, Tag, of the attributable piece of information 210 which is unique in the bicycle electronic system 10 and more in general unique in the set of all the possible components of every configuration of the bicycle electronic system 10. In the present description and in the attached claims, the expression "unique identifier" means that the identifier is different and distinguishable from all the other unique identifiers of the same class, in the case in point in the class of attributable pieces of information 210.

Field 225, completely optional, comprises one or more identifiers, Access, of access privileges to the InfoTag 210 or to the value of its field Data 221. Merely by way of non-limiting example, the field Data 221 may be read-only, writable, writable once only, etc.; the attributable piece of information or InfoTag 210 may be made accessible only when there is a pre-selected component in the system 10, for example only when there is the smartphone 29; the attributable piece of information may require encrypting or not and thus be "private"; the attributable piece of information may be transmissible, receivable or transmissible and receivable; etc.

Field 226, completely optional, comprises a description, Description, of the attributable piece of information 210, preferably intelligible by a human user. If present, field 226 may be transmitted in the network or not.

Field 223 may be omitted from the data structure 200 in case all the system components 10 have the entire database of attributable pieces of information at their disposal a priori, and know a priori the type of such pieces of information.

Alternatively, field 223 may be omitted from the portion of the InfoTag 210 which is communicated in the bicycle electronic system 10. Merely by way of non-limiting example, a component which only contains a speedometer and may only communicate a property relating to the measured speed need not necessarily communicate the type (numerical value, in a speed unit of measurement) if all the components which should receive the measured speed already have at their disposal the piece of information that such measured speed is expressed, for example, in km/h.

Through the data structure 200 and the uniqueness of the identifiers Tag 224 of attributable piece of information, the bicycle electronic system 10 is modelled as a set of properties identifiable in a unique manner (namely, without possibility of ambiguity), which represent the relevant elements of the system, among which elements that may be detected, configured, altered—by external events, by operators, or by program instructions—during use of the bicycle electronic system 10, etc.

The fields 222-225 have for example a fixed length; as already mentioned, field 224 has a fixed or variable length which depends for example on the data type Type (field 223) and which may be expressed in field Len 222.

The format of an attributable piece of information 210 shown in FIG. 4 is susceptible of other changes, besides what has been said above, for example the order of the fields 221-226 may be different, and some fields may be omitted. It is noted, in particular, that for some aspects and/or secondary features of the subject-matter disclosed herein, only field Tag 224 may be necessary, and for some aspects of the subject-matter disclosed herein, only field Data 221 may be necessary.

The identifier Tag of an attributable piece of information 210, stored in field 224, may also encode a component identifier.

The component identified by a Tag may be the same component 11 to which the attributable piece of information 210 identified by the Tag is attributable, namely the component which exposes in the network the attributable piece of information 210 identified by the Tag under consideration. Alternatively, the component identified by a Tag may be a component 11 of the bicycle electronic system 10 different from the component which exposes in the network the attributable piece of information 210 identified by the Tag under consideration.

From another point of view, the component identified by a Tag may be the addresser component of a communication related to the attributable piece of information 210 identified by the Tag, or the component identified by a Tag may be the addressee component of a communication related to the attributable piece of information 210 identified by the Tag.

For example, an attributable piece of information 210 related to a parameter of a specific program of a component 11 may have that component 11 encoded in its Tag, which serves as addressee component when the value of the parameter is written by a different system component 10 and as addresser component when the value of the parameter is communicated to a different system component 10.

In this context, those skilled in the art will understand that components playing an analogous or similar role may be identified within a Tag 224 irrespectively of the model thereof, or components playing an analogous or similar role, but of a different model may be identified within a Tag 224 in a different manner, and there may be combinations of the above. Merely by way of non-limiting example, a rear derailleur assembly for a sprocket assembly having 7 sprockets may be identified in the same manner or in a different manner with respect to a rear derailleur assembly for a sprocket assembly having 11 sprockets; two left manual control devices which differ for the shapes of the levers may be identified in the same manner, while two left manual control devices only one of which has a push-button-like actuation intended for selection of an operating mode ("mode" push-button) may be identified within a Tag in a different manner.

A condition which should be met, the Tag 224 being a unique identifier, is that no specific configuration of the system 10 may comprise two attributable pieces of information 210 of two distinct components 11 which have the same Tag 224.

However, one of the Tags 224, called herein All, may also identify, still in a unique manner, the generic component 11 of the bicycle electronic system 10, namely it may expressly identify all the components 11 of the system 10, for the reasons that will be clear hereinbelow.

As discussed above, the rear derailleur assembly 21 and the front derailleur assembly 22 may comprise a respective smart battery 21-2, 22-2. In this case, several alternatives are possible.

In a first case, the smart battery 21-2, 22-2 stores in a memory thereof its own attributable pieces of information 210 and the derailleur 21-1, 22-1 stores, in a memory thereof, a copy of the attributable pieces of information 210 of its smart battery 21-2, 22-2. In a second case, the smart battery 21-2, 22-2 does not store in memory its own attributable pieces of information 210 and the derailleur 21-1, 22-1 stores in a memory thereof the attributable pieces of information 210 of its smart battery 21-2, 22-2. In a third case, only the smart battery 21-2, 22-2 stores in memory its own attributable pieces of information 210, so that the derailleur 21-1, 22-1 stores in memory only its own attributable pieces of information 210. It is noted that in all three cases, the derailleur assembly 21, 22 stores in memory all the attributable pieces of information 210 both of the derailleur 21-1, 22-1 and of the smart battery 21-2, 22-2.

Those skilled in the art will understand what has been described with reference to the rear derailleur assembly 21, to the front derailleur assembly 22 and to the respective smart batteries 21-2, 22-2 may apply also to other devices attached to a component 11 of the system 10, such as for example smart batteries of devices other than derailleurs, or, still by way of non-limiting example, in case for some reason it is desired to consider a component as "secondary", for example the wearable control devices 27, 28 or control devices of the bar-end type (not shown) might be considered "secondary" components of the control devices 23, 24.

Each of the parameters and/or variables and/or constants stored according to the data structure 200 may be a copy—kept up to-date—of an identical parameter and/or variable and/or constant used by a specific program of the component, as defined above, or it may be the only instance of that parameter and/or variable and/or constant.

As mentioned, the properties or attributable pieces of information 210 may be of various kinds, as can be inferred from some non-limiting examples set forth previously and hereinbelow:

a1) a datum relating to the hardware or firmware (e.g. model, firmware version, MAC address)

a2) a datum relating to the network (e.g. status of a connection, network address)

a3) a datum relating to the status of a component (e.g. residual capacity, counter of charge cycles, engaged toothed wheel, current operating mode)

a4) a datum detected by a sensor (e.g. a temperature, a tilt with respect to the ground, a speed, an acceleration)

a5) a datum computed by a component (e.g. pedaling power, cadence, torque)

a6) a parameter of a specific program of a component (e.g. minimum operation time of a push-button, time threshold for distinguishing among a request for single gearshift and a request for multiple gearshift, toothed wheel to be engaged, extra-stroke of a derailleur during a gearshift in order to assist engagement with a toothed wheel)

a7) a datum signaling an error (e.g. battery voltage of a derailleur assembly too low for allowing a gearshift, damaged sensor, request for gearshifting beyond the extreme toothed wheel, jammed manual lever).

A property or attributable piece of information 210 may also be as a matter of fact a "multiple property" or "multiple attributable piece of information" by defining a data type wherein each bit or group of bits is indicative of a respective elementary property. For example, an InfoTag 210 "status of the device" may gather some pieces of information relative to a component 11, for example the presence of one or more errors of a different kind when one or more preset bits of its value are set to a preset Boolean value (for example to 1). Still merely by way of non-limiting example, a "multiple property" may provide several indications relating to a battery, such as battery being charged (indicated by one bit), over-temperature under charge (indicated by a different bit), approximate residual charge level (indicated for example by two other bits as 00 completely discharged, 01 low battery, 10 sufficient charge).

Payload

With reference to FIG. 5, the format of the payload 250 of a packet communicated in the network, or electronic message, is now described, which is defined by the Upper protocol for the exchange or communication of the attributable pieces of information 210 of the components 11 of the bicycle electronic system 10.

When a specific attributable piece of information 210 or "property" candidate to communication in the network should be actually communicated in the network, at least some of its fields are incorporated in a payload 250 of a packet or electronic message which is transmitted in the network by the lower layers 52-54, 62-63 of the network architecture 50, 60 (or corresponding lower levels in network architectures other than the ISO/OSI model 50 and than the BLE architecture 60). In a manner per se well known, the communicated packet contains an overhead (header and any other fields), besides the payload 250. The overhead contains the information necessary and sufficient to transmit the payload as data packet.

The lower layers or levels 52-54, 62-63 of the network architecture 50, 60 (or corresponding lower levels in network architectures other than the ISO/OSI model 50 and than the BLE architecture 60) are typically hardware and software components controlled by software libraries made available by the hardware manufacturer or by third parts, in other words they are typically firmware components.

The format of the payload 250 comprises a field 261 which comprises an instruction or operation unique identifier, Opcode, better described hereinbelow. Field Opcode 261 has a fixed length.

The format of the payload 250 comprises a field 262 which comprises the attributable piece of information 210 or at least some of its fields 221-226. For simplicity of presentation and merely by way of example, hereinbelow the communication of the entire attributable piece of information 210 will be referred to, unless otherwise specified.

It should however be emphasized that for some aspects and/or secondary features of the subject-matter disclosed herein, only field Opcode 261 may be necessary, and for some aspects of the subject-matter disclosed herein, only field InfoTag 262 may be necessary.

Optionally, the payload 250 is not limited to fields 261-262, rather it may comprise one or more repetitions of the fields 261-262, related to a different attributable piece of information 210.

In the present description and in the attached claims, under expression "basic-payload" 260, the assembly of fields 261, 262 related to a specific attributable piece of information 210 will be referred to when it is necessary to distinguish that basic-payload 260 from the entire payload 250.

The number of basic-payloads 260 in each payload 250 may vary depending on the length of each specific basic-payload 260, namely depending on the length of each property or attributable piece of information 210 transmitted, as expressed in its field 222; alternatively the number of basic-payloads 260 may be fixed for all payloads 250.

There may be an upper limit to the number of basic-payloads 260 in each payload 250, dictated by a maximum length of payload in one of the lower layers 52-54, 62-63 of the network architecture 50, 60 (or corresponding lower levels in network architectures other than the ISO/OSI model 50 and than the BLE architecture 60).

The format of the payload 250 may comprise a field, optional and not shown for the sake of simplicity, which specifies whether the rest of the payload 250 is encrypted. Alternatively, each basic-payload 260 may comprise a field, not shown for simplicity, which specifies whether the rest of the basic-payload 260 is encrypted. Still alternatively, that information may be encoded for example in field 225 Access.

The operation identifier Opcode communicated with field 261 may represent whatever instruction executable by a component 11 of the system 10 and which may be issued by a different component 11 of the system 10.

Merely by way of non-limiting example, the following types of instructions and specific instructions are mentioned hereinbelow:

b1) an instruction, called herein Notification, to acquire or take note of the value indicated in field Data of the transmitted property or attributable piece of information 210 identified in field 262;

b2) an instruction, called herein Write Property, to modify the attributable piece of information 210 identified in field 262; in this case the value that the property, identified by the Tag 224, should assume is indicated in field Data 221;

b3) an instruction, called herein Read Property, to request reading of, namely to request to transmit as a reply, the attributable piece of information 210 identified in field 262, in particular in field Tag 224: in this case the length indicated in field Len 222 may be set to zero, field Data 221 being absent, or the value indicated in field Data 221 may be a predefined value, for example all 0es or all 1s;

b4) an instruction to modify the access privileges of an attributable piece of information 210 identified in field 262, in particular in field Tag 224; in this case, the value of the fields Data and Len 221-222 may be managed as in case c3);

b5) an instruction, called herein Read All Properties, to request to transmit as a reply all the attributable pieces of information 210 of a component 11;

b6) an instruction to perform a specific action on data in memory, for example a Reset to factory values or a Delete Whitelist which deletes network information, or on devices of the component, for example to switch a LED on;

b7) an instruction related to the specific program of a component, for example a function call or a passing of parameters or an instruction to switch operating mode etc.;

b8) an instruction representative of an input or manual command received by the cyclist C;

b9) combinations of the above.

It is noted that in cases b6-b8 and in analogous cases, the attributable piece of information 210 contained in field 262 is a piece of information auxiliary to the execution of the instruction, which for example contains as only significant data the Tag 224 encoding the component 11 addressee of the instruction and thus of the payload 250, or which additionally contains, in field Data 221, a parameter to be passed to the specific program of the component 11, etc.

The above-described Tag 224 All, if inserted in the InfoTag 262, allows an addresser component 11 to send an instruction, encoded in field Opcode 261, which is directed to all the other components 11, sparing network traffic and thus implementing a sort of broadcast. For example, such an instruction may be an instruction Reset to factory values, Delete Whitelist, Enter setting mode, Read software version, etc.

It is noted that a basic-payload 260 (or the entire payload 250) containing the instruction Notification is usually formed and initially transmitted in the network by the component 11 to which the attributable piece of information 210 identified by Tag 224 in field 262 pertains, still then being able to be possibly forwarded.

Just for the purpose of better clarifying the instruction Notification, some practical examples are provided: a component 11 may transmit or "notify" its software version, the temperature detected by a sensor thereof, the depression status of a push-button thereof (e.g. if the component 11 is a control device 23, 24, 27, 28), its charge level (e.g. if the component 11 is a smart battery 21-2 or 22-2) or the charge level of a battery thereof (if the component 11 is a derailleur assembly 21, 22 or a derailleur 21-1, 22-1), etc., for example upon request or as a consequence of the fact that the respective value, which is indicated in field Data 221, has changed.

It is furthermore noted that a basic-payload 260 (or the entire payload 250) containing an instruction, encoded in field Opcode 261, different from the instruction Notification is usually formed and initially transmitted in the network by a component 11 different from the component 11 to which the property identified in field 262 pertains, in particular by a component 11 different from that identified in field Tag 224, still it also being able to be possibly forwarded.

However, a first component 11 may also use, to transmit the value of a property thereof to a second component 11, alternatively to instruction Notification, a command Write Property in case the second component 11 has a property representing the property of the first component 11. For example, a first component 11 may have an attributable piece of information "model" and communicate it with an instruction Notification to a second component 11, or the second component 11 may have an attributable piece of information "model of the first component" and the first component 11 may communicate its own model through an instruction Write Property.

Merely by way of non-limiting examples, a first component 11 may:

c1) request, through the command Read Property, to a second component 11 to transmit or "notify" its software version, etc., c2) request, through the command Read All Properties, to a second component 11 to transmit or "notify" all its attributable pieces of information 210, so as to learn which properties it has, and the respective identifiers Tag 224, c3) request to change a parameter or a constant or a variable of the specific program of the second component 11 (for example, to change a minimum depression time of a push-button in order to consider the input of the cyclist valid), through the command Write Property if the second component 11 has a property 210 which describes said parameter or constant or variable, or through a special instruction, e.g. an instruction Set RTC (set the real time clock), etc., c4) request to a second component 11 to enter a specific mode, through the command Write Property if the second component 11 has a property which describes the operating mode, or through a special instruction, e.g. an instruction Set Adjustment Mode, an instruction Enter DFU (activate the firmware update mode), etc., c5) request to a second component 11 to perform an action, for example through an instruction Delete Whitelist, an instruction Reset to Factory Settings, an instruction Show Battery Level to display the percentage charge of a battery in a luminous scale, etc., c6) request to a second component 11 to execute a function call of its specific program 280, previously known to the first component 11, or to execute a portion thereof, for example through an instruction Increment Property to increment a property identified in field data 221 by a specific value, also identified in field data 221, etc., c7) forward an input to a second component 11, for example a manual command received by the cyclist or other human operator, for example through an instruction Button Pressed or an instruction Shift Up, or through an instruction Notification or Write Property of a suitable property representative of the status of the push-button (e.g. transmitting a value 0 or a value 1 in field Data 221 of a property Button Status) or representative of a gearshift request (e.g. by transmitting a preselected value in field Data 221 of a property Shift request), etc., c8) modify the access privileges 225 of a property of the second component 11.

It is understood, also from the examples provided above, that there may be two or more different manners to express and communicate in the bicycle electronic system 10 one same thing, suitably defining one or more properties which represent it, attributable to one or more components, possibly together with other information and/or using one or more instruction identifiers Opcode 261 for its communication.

It is noted that a payload 250 may in general comprise two or more basic-payloads 260 comprising instructions Notification, two or more basic-payloads 260 comprising instructions other than Notification, two or more basic-payloads 260 comprising one or more instructions Notification and one or more instructions other than Notification.

It is understood, also from the examples provided above, that it turns out to be advantageous that the property identifier Tag 224 may also encode the addresser or addressee component 11. This information may be used, in a manner which will be clear to those skilled in the art, also in the light of the present description, in order to assist the routing of the payload 250 or of the basic-payload 260 and/or to group together basic-payloads 260 in payload(s) 250 and/or to subdivide the payload 250 in basic-payloads 260 and possibly re-group them together in one or more different payload(s) 250 and/or to manage transmission queues and priorities, etc.

Indeed, the receiving component 11 distinguishes whether the payload is addressed thereto or not based on the instruction encoded in field Opcode 261 and/or the attributable piece of information identified by the Tag 224. When the instruction is addressed thereto, the receiving component 11 executes it; otherwise it forwards the payload 250/basic-payload 260 to the addressee component 11 or to a different component 11 to which the addressee component 11 is directly or indirectly connected, which then provides to forward in turn the payload 250/basic-payload 260.

As mentioned above, the communication of the payload 250 is left to the lower layers 52-54, 62-63 of the network architecture 50, 60 (or corresponding lower levels in network architectures other than the ISO/OSI model 50 and than the BLE architecture 60).

As mentioned above, the bicycle system 10 may include one or more network(s), of the wired type and/or of the wireless type.

Along the wired type network links, a serial communication protocol is for example used for the communication of the payloads 250. It is recalled that in the case of the illustrative system 20, the wired links are provided for within the derailleur assemblies 21, 22, between the derailleurs 21-1, 22-1 and the respective smart-battery 21-2, 22-2.

Along the network links of a wireless type other than BLE, a suitable wireless protocol is used for the communication of the payload 250.

In FIG. 6 a serial packet or more in general a non-BLE packet 290 is schematically shown, communicated on one of these networks. The non-BLE packet 290 comprises a payload 291 and an overhead 292. The overhead 292 is shown in front of the payload 291 and optionally behind the payload 291, but it may be only behind or both in front of and behind the payload 291. The payload 291 contains, and in particular corresponds to, payload 250.

Along the network links of wireless BLE type, for the communication of the payload 250 a specific communication method or protocol is used in the sub-level 61-1 of the Application level 61 of the BLE network architecture 60 (corresponding to the sub-level 51-1 of the ISO/OSI model 50, or lower sub-level of the upper level of the network architecture), the above-mentioned Lower protocol, described hereinbelow.

Sub-Level Comparatively Lower of the Upper Level of the Network Architecture (Lower Protocol)

The Lower protocol already mentioned above is now described, which is defined in the sub-level 51-1 of the Application level 51 of the OSI model 50 and in particular in level 61-1 of the Application level 61 of the BLE network architecture 60.

On the Lower protocol and/or on the combination of the Upper protocol with the described Lower protocol, some communication methods (transmission methods and/or reception methods), as well as other related aspects, of the subject-matter disclosed herein, are based.

As mentioned, BLE is a technical standard of communication, with low energy consumption, provided, in particular, for small discrete data transfers, for example status information of a sensor, current time of a clock etc. Although BLE is well known, some of the principles of BLE relevant for the purposes of the subject-matter disclosed herein are summarized hereinbelow.

BLE standard defines hardware specifications and software specifications, the second ones being of particular interest herein.

BLE defines the roles of master and slave, among others, in the lower layers of the network architecture 60 (in the Link layer of the Controller 63), and the roles of central and peripheral in the Generic Access Profile (GAP) of the Host layer 62, intermediate in the network architecture 60. A master, central device establishes and manages the connection with one or more slave, peripheral devices. A device may play plural GAP roles, and thus assume both states of central and peripheral, provided that the Link layer supports that.

BLE defines profiles, which describe how the data transmission should be implemented in a particular application. The greatest part of the profiles is based on the Attribute Protocol (ATT) and on the Generic Attribute Profile (GATT), which is a general specification, defined in the Host layer 62 of the network architecture 60, which established how data is organized and exchanged, as data packets called attributes, on a BLE connection. Some attributes may be gathered in a service, so that a profile may contain one or more services, each service having one or more attributes.

The Bluetooth Special Interest Group (SIG) defines specific profiles and services, each targeted to applications of a certain type, for example the profile BPP—Blood Pressure Profile for the measurement of the blood pressure; the profile CSCP (Cycling Speed and Cadence Profile) for the measurement of cadence and speed through sensors attached to a bicycle; the profile CPP (Cycling Power Profile) for the measurement of the pedaling power through sensors attached to a bicycle; the service Battery Service which exposes the battery status and the level of the battery/ies of a device etc.

Other profiles and services may be freely defined.

Figure 7:
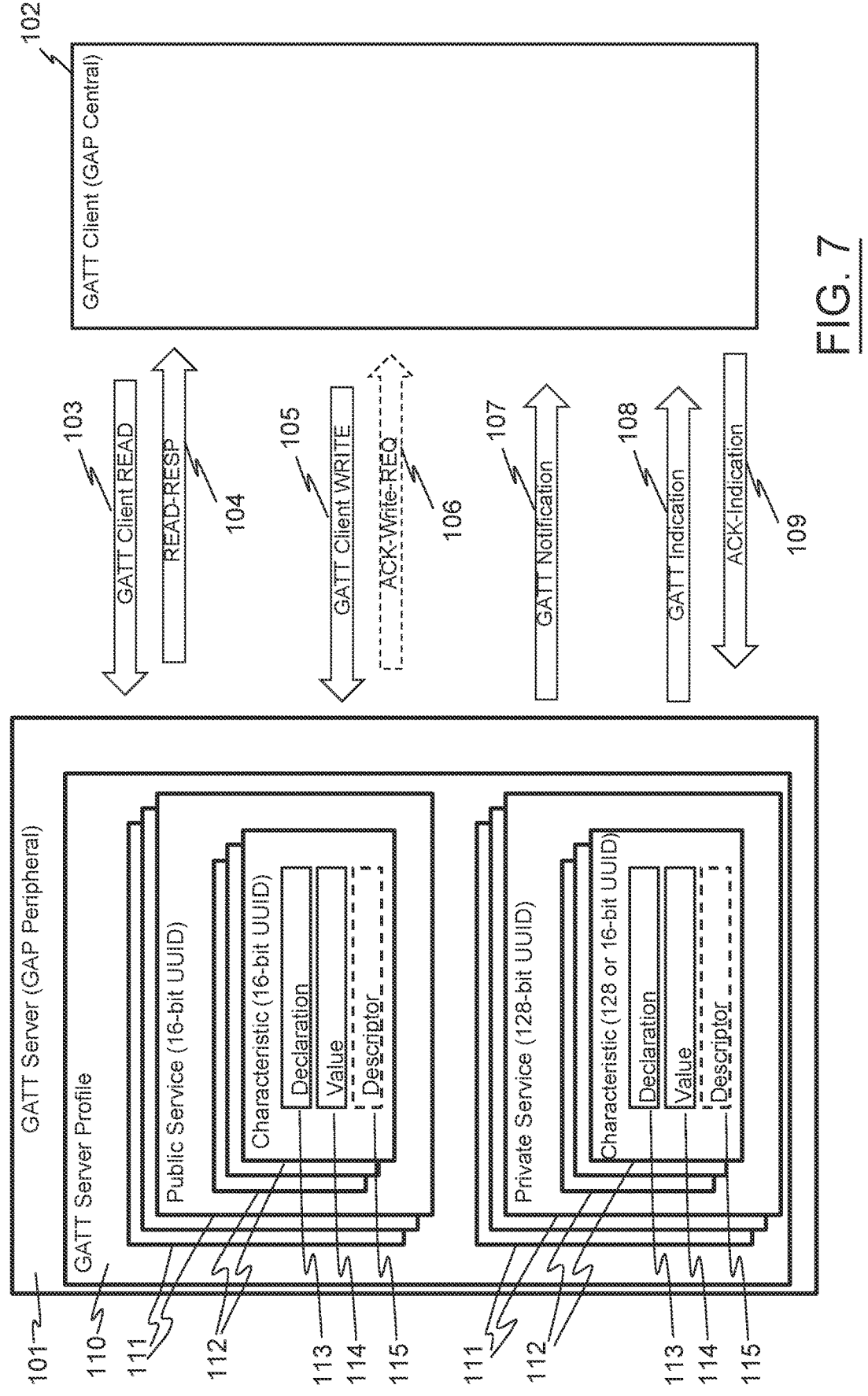

The GATT defines the server and client roles. With reference also to FIG. 7, the server device 101, typically but not necessarily associated with the slave and peripheral roles, contains the data, organized as a is database of Attributes, receives requests from a client device 102, and responds to the requests.

The client device 102, typically but not necessarily associated with the master and central roles, provides to interrogation as far as the presence and nature of the attributes available on a server is concerned, through the Discovery Service (discovery of the services), sends requests to the server (operation called GATT Client Read 103) and receives the responses (Read-RESP 104).

The client device may also modify the attributes on the server when they are available for writing (GATT Client Write 105), possibly receiving a confirmation from the server that the change took place (ACK-Write-REQ 106).

The server device may also spontaneously send data through notifications or indications (GATT Notification 107, GATT Indication 108), in the case of indication receiving a confirmation from the client that reception took place (ACK-Indication 109).

The GATT defines the data structure of the database of attributes 110 maintained in a GATT server 101, also called GATT Server Profile 110. This is a hierarchical structure wherein the attributes of a GATT server profile 110 are grouped in services 111, each of which contains one or more characteristics 112. Each characteristic 112 includes a declaration attribute 113 and a value attribute 114, and may include zero or more descriptor attributes 115.

The declaration attribute 113 contains the metadata for the value attribute 114. The descriptors 115 allow the metadata contained in the declaration 113 to be further expanded, for example they may include extended properties (Extended Properties), a user-readable description of the respective characteristic (Characteristic User Description), a switch which enables/disables server-initiated updates (CCCD Client Characteristic Configuration Descriptor), namely which enables/disables the above-mentioned GATT Notification 107 and GATT Indication 108.

A service 111 is, therefore, a collection of data and associated behaviors for carrying out a particular function.

The characteristics 112 are data containers. Each characteristic 112 is associated with an elementary piece of information provided by the GATT server 101, for example the battery level or the measurement of blood pressure, with reference to the examples of SIG profiles mentioned above.

Figures 8, 10:
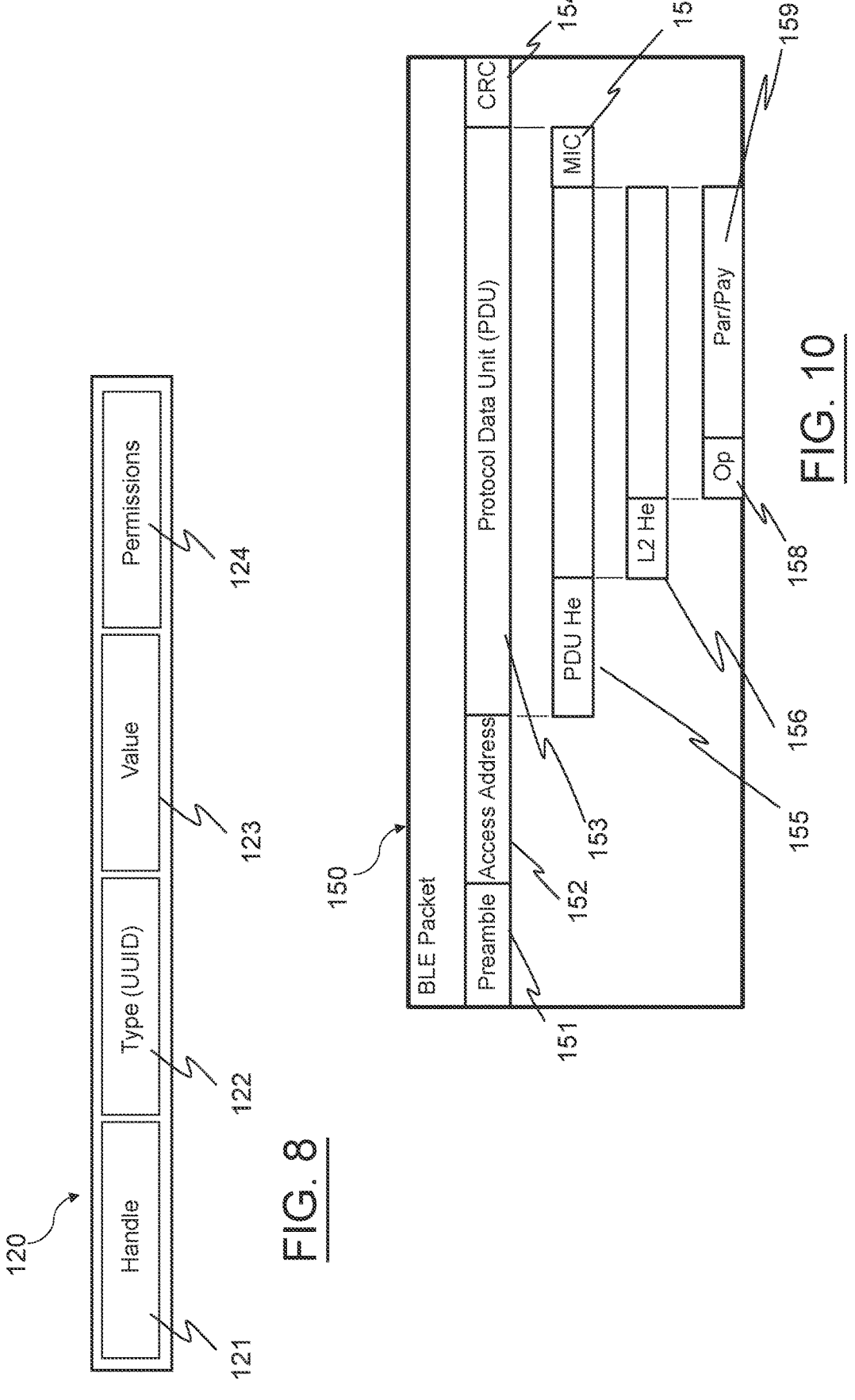

With reference to FIG. 8, each attribute 120 (be it a declaration of service 111 of the GATT server 110, a declaration 113 of characteristic 112, a value 114 of characteristic 112 or a descriptor 115 of characteristic 112) has a data structure which comprises:

a handle 121 which identifies it and renders it addressable,
    a Type 122 encoded by a UUID (Universally Unique Identifier), which determines the type of the data present in the attribute value 123,
    said Value 123 (of variable length), which represents the true data contained in the attribute, accessible by a Client 102, or metadata related to the attribute 120,
    a set of Permissions 124 related to the value 123 of the attribute 120 (read, write, no access; encryption requirement; authorization requirement).

As mentioned above, the GATT services may be public, defined by SIG and identified by a 16-bit UUID which represents a preset portion of a 128-bit UUID, or private, defined by the user and identified by a 128-bit UUID. Other UUIDs allocated by SIG (also 16 bit long) comprise UUIDs of characteristics and type of GATT object (GATT Characteristic and Object Type), UUID of GATT descriptor, UUID of GATT service, UUID of GATT unity of measurement, and still others.

Merely by way of non-limiting example, FIG. 9 schematically shows an example of a simple GATT profile 130 which represents, according to a conventional BLE implementation, a wake device based on an accelerometer and having its own battery, for example embodied in a bicycle crankarm. The GATT profile 130 comprises two services 131, 132. The first service 131 is a public service or SIG service Battery, which comprises a single Characteristic Battery Level 133. The second service 132 is a private service Acceleration/Wake, which comprises six characteristics 134-139, which represent the acceleration along three cartesian axes, and a wake threshold associated with the acceleration along each axis.

Some of the characteristics 133-139 have a descriptor, others have none, so that the GATT profile has a total of twenty attributes, identified by a respective handle 121. In the example, the handles 121 are consecutive (numbers from N to N+19); however this is not strictly necessary, it suffices that the handles in a GATT server increase.

The first attribute 140 is the declaration of the service 131 and indeed its type 122 is SERVICE or UUID 0x2800, which is allocated by SIG to the declaration of primary service. In the present description and in the attached claims, prefix 0x identifies numbers in the hexadecimal system. Its permission 124 is readable (R—Read), as for all declaration attributes, because a client should be able to read the services exposed by a GATT server. Its value is 0x180F, which is allocated by the SIG to the Battery service.

The second attribute 141 is the declaration (113 in FIG. 7) of the single characteristic 133 of the service 131, Battery Level. Indeed, its type 122 is CHAR or UUID 0x2803, which is allocated by SIG to the characteristic declaration and its permission 124 is readable. Its value 123 is "R|NOT|N+2|0x2A19", indicative of the fact that is a characteristic which may be communicated through GATT Client READ 103 or through GATT Notification 107, namely a characteristic which is transmitted by the server without the need of interrogation by the client nor of confirmation of receipt, that the related handle is N+2—namely that of the third attribute 142, which contains the effective value of the characteristic—and that the characteristic is Battery Level, to which the SIG has allocated UUID 0x2A19.

The third attribute 142 is, as mentioned, the value (114 in FIG. 7) of the characteristic 133 Battery Level, identified indeed by handle N+2 and by type 0x2A19 consistently with the declaration in the attribute 141; its permission is read Only® because it is, as declared through the second attribute 141, a characteristic which may be communicated through GATT Client READ 103 or through GATT Notification 107. Its value is a numerical value expressed in a percentage, represented in FIG. 9 as variable "battery level", for example 35%.

The fourth attribute 143 is a descriptor (115 in FIG. 7) of the first characteristic 133 Battery Level. Its type 122 is CCCD or Client Characteristic Configuration Descriptor or UUID 0x2902, which is allocated by the SIG to said switch which enables/disables server-initiated updates; its permission 124 is read/write (R/W) and its value is, for example, set to Notification Enabled or 0x0001 (value allocated by the SIG). Thus, in the example the client receives the notifications (GATT Notification 107) as the battery level percentage value changes, because of the value Notification Enabled in the descriptor 143; the client may modify that value, changing it into NONE or 0x0000 if the client is not interested in being automatically informed when the battery level percentage value changes. Also in the latter case, the client may in any case learn the battery level percentage value sending a GATT Client READ 103 related to the characteristic 133 Battery Level.

Turning to the private service Acceleration/Wake 132, it is defined by the fifth attribute 144 in a manner analogous to the definition of the service SIG Battery through the attribute 140, with the difference that the value 123, indicated herein as S acc (Service Accelerometer), is expressed with a 128-bit UUID.

The sixth, seventh and eight attributes 145, 146, 147 are respectively the declaration, the value and the descriptor of the first characteristic 134, Acceleration X or acceleration along axis X, and are analogous, mutatis mutandis, to the above described attributes 141-143 with respect to the characteristic Battery Level, with the difference that, since it is not a SIG characteristic, the characteristic type, indicated herein as CaccX (Characteristic Accelerometer X) is expressed with a 128-bit UUID both in the field value 123 of the declaration 145 and in the field Type 122 of the attribute value 146. Also the characteristic 134, Acceleration X, is a characteristic which may be communicated through GATT Client READ 103 or GATT Notification 107 ("R|NOT" in field value 123 of the declaration 145). Its value (expressed in G) is not of interest to the client, in the example, because the value 123 of the descriptor 147 is set to NONE or 0x0000, still being modifiable (read and write or R/W permissions in field 124), so that the server does not emit any GATT Notification 107 nor any GATT Indication 108 as the acceleration along axis X changes.

The ninth and tenth attributes 148, 149 are, respectively, the declaration and the value of the second characteristic 135, Wake Threshold X or wake threshold along axis X; the second characteristic 135 lacks descriptors. Also in this case, the type of characteristic, herein indicated as CwakeX (Characteristic Wake X) is expressed with a 128-bit UUID both in field value 123 of the declaration 148 and in field Type 122 of the value attribute 149. The field value 123 of the attribute value 149 contains the current value of a variable or parameter indicated herein as Acc. X. Thr. The characteristic 135, Wake Threshold X is a read/write characteristic, it being a parameter modifiable by a client: field value 123 of the declaration 148 contains "R|W" and field Permissions 124 of the value attribute 149 contains R/W. The client 102 may thus request the server which one is the current value of the variable or parameter Acc. X Thr. Through a GATT Client READ 103 and/or change such value through a GATT Client WRITE 105.

The characteristics 136, 137 and 138, 139 correspond, mutatis mutandis, to the characteristics 134, 135, relative to the cartesian axes y and z, respectively.

The format of the BLE packets 150, as shown in FIG. 10, comprises a packet header used by the layer Controller 63 of the BLE architecture 60, which header comprises, in particular, a preamble 151 and an access address 152; a portion named information unity PDU, Protocol Data Unit 153, of variable length; and a cyclic redundancy check string or CRC 154, also used by the layer Controller 63.

The PDU 153 comprises in turn preambles 155, 156 and a message integrity check string, MIC Message Integrity Check 157, used by the levels from the Host layer 62 of the BLE architecture 60; and an operation code Op 158 and a payload 159, used by the layer Application 61 of the BLE architecture 60.

It is noted that the MIC string is absent in the advertising packets which are exchanged during the establishment of the network and for management thereof, while it is present in the case of data packets, namely exchanged once the network has been established and the BLE connection between server and client has been established; furthermore it is worthwhile mentioning that in the Host layer 62 of the network architecture 60, BLE also provides for a security management protocol (SMP, Security Manager Protocol), which applies security algorithms for encrypting and decrypting the data packets.

The format of the packets transferred in BLE at the lowermost levels of the network architecture, as well as the advertising packets, are however not of particular interest in the context of the subject-matter disclosed herein.

The payload 159 is that containing a BLE attribute 120; the operation code Op 158 indicates, among other things, if it is an operation GATT Client READ 103, Read-RESP 104, GATT Client Write 105, ACK-Write-REQ 106, GATT Notification 107, GATT Indication 108 or ACK-Indication 109.

Because each BLE attribute 120 is communicated with a respective BLE packet 150, it is understood that a conventional BLE implementation is well suited to simple systems, wherein the data to be exchanged among BLE server 101 and client 101 is relatively little, while it may turn out to be unsuitable per se for a generic bicycle electronic system 10, in order to describe which, the (SIG or private) services exposed by each BLE server 101 should contain an even very large number of attributes. Already from the simple example shown in FIG. 9 and described above it has indeed been seen that, only for communication of some of the data available by an instrumented crankarm, about twenty attributes are needed; it is therefore understood that, for example, for the illustrative bicycle electronic system 20, according to a conventional BLE implementation, hundreds if not thousands of attributes are needed.

Because the step of preliminary exchange (exposure) of services—which as mentioned occurs, after the establishment of the BLE network, in the Discovery phase—requires an increasing time as the number of attributes which have to be communicated by the BLE server 101 increases, each in its own packet 150, it is understood that the duration of such a Discovery phase may be prohibitively long.

Also once the Discovery phase is ended, the data exchange according to a conventional BLE implementation, through a packet 150 for each value attribute 114 of characteristic 112, may require a very large number of packets and as a consequence long average communication times.

The Lower protocol for a bicycle electronic system 10 disclosed herein exploits the fact that the BLE profiles and services may be customized (private services), regardless of what happens at the lower levels (Host 62 and Controller 63).

Figure 11:
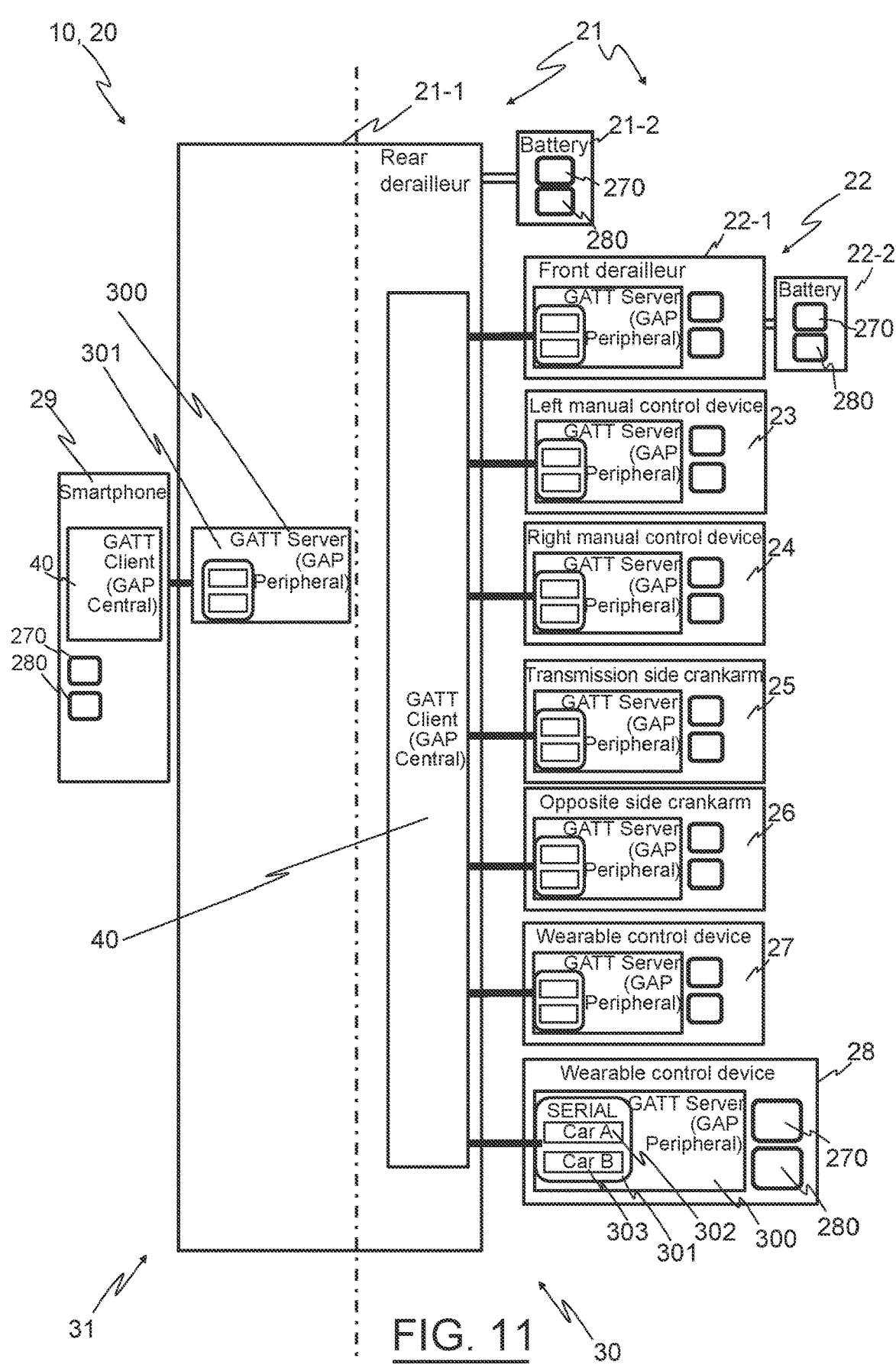

Merely by way of non-limiting example, but for greater clarity of presentation, the related description is made with particular reference to the illustrative bicycle system 20, which may be recognized in FIG. 11.

At least two components 11 of the bicycle electronic system 10, all the components 21-29 in the illustrative system 20, are provided with at least one respective "BLE module", identified hereinbelow as 40 in case it plays the role of BLE central, client and as 300 in case it plays the role of BLE peripheral, server.

At least one component 11 of the bicycle system 10, the derailleur 21-1 of the rear derailleur assembly 21 in the case of the system 20, plays the role of BLE central, client 40 with respect to the cycling network 30, and at least one other component 11—all the remaining components 22-28 in the case of the illustrative system 20—plays the role of BLE peripheral, server 300 in that cycling network 30.

In case an interacting network 31 is provided for, at least one cycling specific electronic device, again the derailleur 21-1 of the rear derailleur assembly 21 in the case of the system 20, plays the role of BLE peripheral, server 300 with respect to the interacting network 31, and at least one general-purpose electronic device, the smartphone 29 in the case of the illustrative system 20, plays the role of BLE central, client 40. Alternatively, at least one cycling specific electronic device may play the role of BLE central, client 40 with respect to the interacting network 31, and at least one general-purpose electronic device may play the role of BLE peripheral, server 300.

In the case of the illustrative system 20, the derailleur 21-1 of the rear derailleur assembly 21 thus plays a dual role and in FIG. 11 it is shown provided with two distinct BLE modules 40, 300 to illustrate this; however, those skilled in the art will understand that the dual role may be played by a single BLE module with dual functionality. Furthermore, the roles of one and a same component in the two networks 30, 31 need not necessarily be different, it could be BLE server in both or BLE client in both.

The choice of the derailleur 21-1 of the rear derailleur assembly 21 for playing the dual role of BLE central, client in the cycling network 30 and of BLE peripheral, server with respect to the interacting network 31 is preferable in that the rear derailleur assembly 21 is that provided with the largest capacity battery 21-2, but other choices are possible.

Furthermore, it is not strictly necessary that the BLE central of the cycling network 30 is the same component which is connected in the interacting network 31; in any case for simplicity of presentation, exclusive reference will be made hereinbelow to that configuration for brevity.

With reference to the wearable control device 28—in the other devices some details and/or reference numerals are omitted for the sake of clarity—the GATT server 300 of each component 21-28 which plays the role of BLE server comprises and exposes in network a GATT private service 301 called herein "Serial". The GATT service Serial 301 suffices, but the GATT server 300 could also expose other services. The service Serial 301 comprises, in the case shown, two characteristics, Characteristic A 302 and Characteristic B 303.

For completeness, in FIG. 11 there are also schematically illustrated, in each component 11 of the illustrative system 20, a module 270 implementing the above-mentioned Upper protocol, or the respective part (instructions and part of database), as well as a module 280 implementing the above-mentioned specific program of the component. Also these modules are only numbered for the wearable control device 28 and, again for the sake of greater clarity, logical links among the various modules 270, 280 and 40 or 300 are not shown. Some components 11 of the bicycle electronic system 10 may lack a specific program 280.

Figure 12:
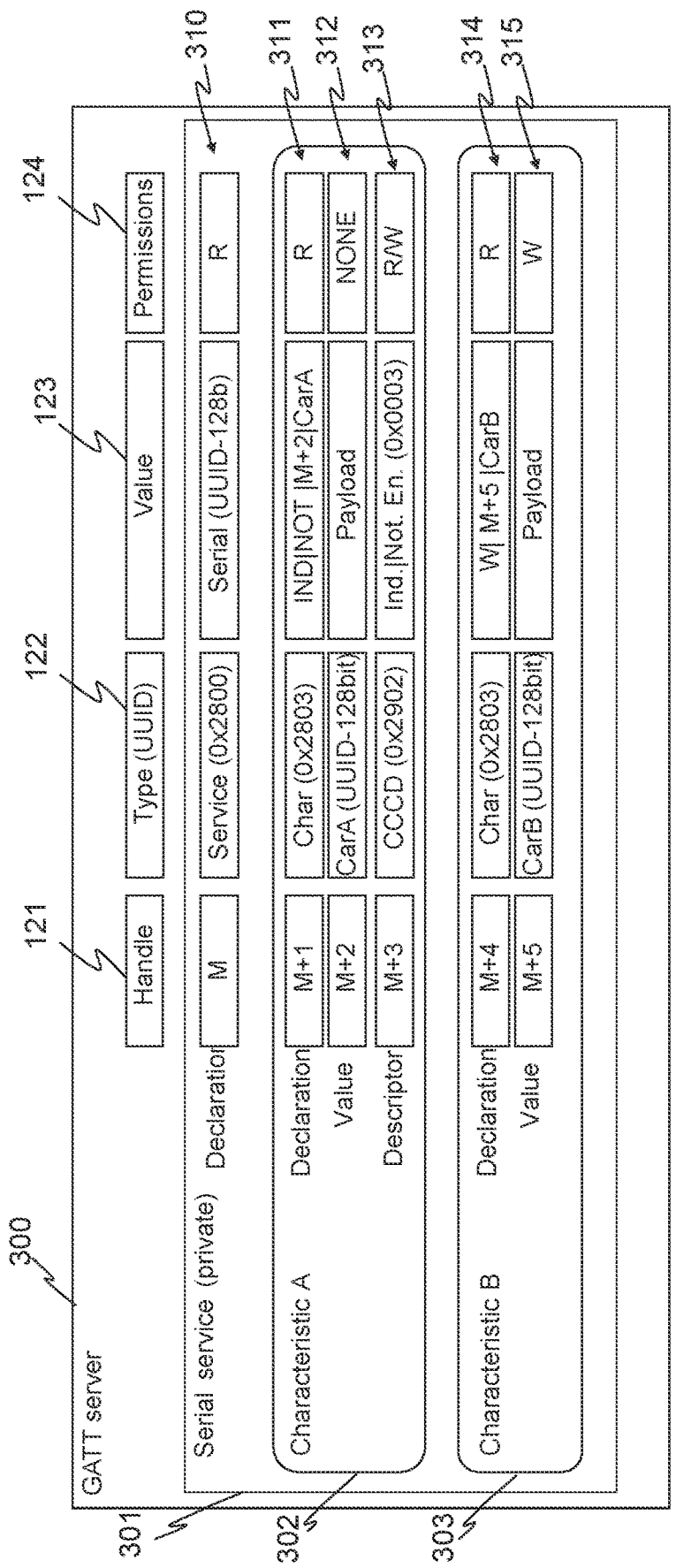

The GATT service Serial 301 is schematically represented in FIG. 12 in an analogous manner to the above-described FIG. 9.

Characteristic A 302 has a descriptor, while Characteristic B lacks descriptors, so that the GATT service Serial 301 is defined by only six attributes 310-315, identified by a respective handle 121. In FIG. 11, the handles 121 are consecutive (numbers from M to M+5); however, this is not strictly necessary, it suffices that they are increasing.

The first attribute 310 is the declaration of the service 301 and indeed its type 122 is SERVICE or UUID 0x2800, which, as seen above, is allocated by the SIG to the declaration of primary service. Since this is a private service, its value 123, Serial, is expressed by a 128-bit UUID. Its permission 124 is Readable®, as for all declaration attributes, as discussed above.

The second attribute 311 is the declaration of the first characteristic 302, or Characteristic A 302. Indeed its type 122 is CHAR or UUID 0x2803 (allocated by the SIG to the declaration of characteristic, as mentioned above) and its permission 124 is readable. Its value 123 is "IND|NOT|N+2|CarA" wherein CarA is expressed by a 128-bit UUID, indicative of the fact that it is a characteristic which may be communicated through GATT Indication 108 or through GATT Notification 107, namely a characteristic which is transmitted by the GATT server 101 without the need of interrogation by the GATT client 102, respectively with or without confirmation of receipt Ack-Indication 109. The value 123 indicated above is furthermore indicative of the handle of the Characteristic A 302, namely the handle M+2 of the third attribute 312.

The third attribute 312 is, as mentioned, the value of the Characteristic A 302, identified indeed by the handle M+2 and by the type CarA, expressed as said by a 128-bit UUID. Its permission 124 is NONE in that the characteristic is subject neither to reading nor to writing. Its value 123 is a string of bits which, as better discussed hereinbelow, corresponds to the payload 250 formed by the Upper protocol and shown in FIG. 5.

The fourth attribute 313 is a descriptor of the Characteristic A 302. Its type 122 is CCCD or Client Characteristic Configuration Descriptor or UUID 0x2902, which, as discussed above with reference to the attribute 144 of FIG. 9, is allocated by SIG to a switch which enables/disables updates initiated by the GATT server 101; its permission 124 is read/write (R/W) and its value 123 is, for example, set to Indication|Notification Enabled or 0x0003 (value allocated by SIG).

Thus, in the example the client receives a GATT Notification 107 or a GATT Indication 108 at the discretion of the GATT server when the GATT server 101 desires to spontaneously send a payload 250 formed in the Upper protocol.

Furthermore, in the case shown the GATT client 102 may modify the value 123 of the fourth attribute 313, because the permission 124 is R/W, for example changing it to Notification Enabled (0x0001) to receive only GATT Notifications 107, to Indication Enabled (0x0002) to receive only GATT Indications 108, or in NONE or 0x0000 if one wishes to avoid that the GATT server 101 may spontaneously transmit a payload 250.

Turning to characteristic 303 or Characteristic B 303, the fifth attribute 314 is the declaration thereof, with type 122 CHAR or UUID 0x2803 and permission 124 Read®. The value 123 of the fifth attribute 314 is "W|M+5|CarB" where CarB is expressed by a 128-bit UUID indicative of the fact that it is a characteristic which may be communicated through GATT Client WRITE 105, namely an attribute which may be modified on the GATT server 101 by the GATT client 102. The client may receive, at the discretion of the GATT server, a confirmation (ACK-Write-REQ 106) from the server 101 that the change occurred. The value 123 indicated above is furthermore indicative of the handle of the Characteristic B 303, namely the handle M+5 of the sixth attribute 315.

The sixth attribute 315 is, as mentioned, the value of the Characteristic B 303, identified indeed by the handle M+5 and by the type CarB, expressed as said by a 128-bit UUID. Its permission 124 is write (W) because the characteristic 303 is subject to writing (as expressed in the field value 123 of the attribute 314 declaring it). Its value 123 is a string of bits that, as better discussed hereinbelow, corresponds to the payload 250 formed by the Upper protocol and shown in FIG. 5.

Merely by way of example, no descriptor attribute of the second characteristic 303 is indicated, but vice versa it might be present.

The second characteristic 303 is therefore suitable to be used when a GATT client 102 wishes to send a payload 250 formed in the Upper protocol to the GATT server 101.

It should be noted that in general the service Serial 301 may comprise only one of the characteristics 302, 303. For example, a component 11 of the bicycle electronic system 10 playing the role of GATT server 101 but which need not form any payload 250 according to the Upper protocol does not need a characteristic which may be communicated through GATT Indication 107 or GATT Notification 108 such as the Characteristic A 302. This does not necessarily mean that such a component 11 is unable to transmit anything, because its GATT profile 110 might include one or more other services, containing one or more characteristic(s) which may be communicated through GATT Indication 107 or GATT Notification 108, but which follow(s) a conventional BLE implementation.

Vice versa, a component 11 of the bicycle electronic system 10 playing the role of GATT server 101 but which need not receive any payload 250—formed, by another component 11, according to the Upper protocol—does not need a characteristic which may be communicated through GATT Client WRITE 105 such as the Characteristic B 303. This does not mean necessarily that such a component 11 is unable to receive anything, because its GATT profile 110 might include one or more other services, containing one or more characteristic(s) which may be communicated through GATT Client WRITE 105, but which follow(s) a conventional BLE implementation.

Even more in general, the service Serial 301 may comprise a characteristic which may be communicated through GATT Indication 107 or GATT Notification 108 or GATT Client WRITE 105 and thus suitable for bidirectional communication between a GATT server 101 and a GATT Client 102. However, hereinbelow reference will be made to the specific service Serial 301 of FIG. 12 merely by way of non-limiting example.

As discussed above, the field value 123 of the value attribute 312, 315 of the characteristics A and B 302, 303 corresponds to the payload 250 shown in FIG. 5. From the opposite point of view, in the Lower protocol described herein, the characteristics BLE 302, 303 are used to communicate the payload 250 of the Upper protocol described above.

It is worthwhile emphasizing that the field value 123 corresponds only to the payload formed in the Upper protocol—it being able to also include, as described above, a field relative to encrypting of the entire payload 250, additional or alternative to the encrypting information about the single basic-payload 260; in other terms, field value 123 does not comprise a true data packet formed by a communication protocol, which would on the contrary also have a transmission overhead, namely addressing fields, transmission control fields, etc. (cf. the fields 151-156 of the BLE packet 150 and the fields 292 of the non-BLE packet 290). Field value 123 is thus devoid of transmission overhead, namely it is devoid of information sufficient to directly transmit it as a data packet.

If a payload 250 has to be transmitted by a BLE server 101 to a BLE client 102, such payload 250 forms the value 123 of the Characteristic A 302, and it is received provided that the/each receiving BLE client 102 has enabled the reception of the notifications/indications on such characteristic. An illustrative and non-limiting case is a payload 250 which has to be transmitted by one of the components 22-28 of the cycling network 30 of the illustrative bicycle electronic system 20 to the rear derailleur assembly 21. Another illustrative and non-limiting case is a payload 250 which has to be transmitted from the rear derailleur assembly 21 to the smartphone 29 of the interacting network 31 of the illustrative system 20.

If a payload 250 has to be transmitted from a BLE client 102 to a BLE server 101, such payload 250 forms the value 123 of the Characteristic B 303. An illustrative and non-limiting case is a payload 250 which has to be transmitted from the rear derailleur assembly 21 to one of the components 22-28 of the cycling network 30 of the illustrative system 20. Another illustrative and non-limiting case is a payload 250 which has to be transmitted from the smartphone 29 to the rear derailleur assembly 21 of the interacting network 31 of the illustrative system 20.

A component 11 of the bicycle electronic system 10 may provide, for example, to one or more of the following operations, based on the contents of each specific payload 250:

d1) form a payload 250 containing one or more of its attributable pieces of information 210, having the data structure 200, as a consequence of the fact that the respective value stored in field Data 221 has changed for an external event, or has been expressly changed by the specific program 280 of the component itself, or because a periodic transmission is provided for, or for other reasons; in the case of plural attributable pieces of information 210, each will form the field InfoTag 262 of a respective basic-payload 260; it is noted that the field 261 of each or of the single basic-payload 260 will contain the instruction Notification; and transmit it as value 123 of a characteristic of the service 301, so that the payload 250 will be transmitted as payload 159 of the PDU 153 of a BLE packet 150;

d2) form a payload 250 having at least one basic-payload 260 containing in field 261 an instruction other than Notification and in field InfoTag 262 one of the attributable pieces of information 210 of another component 11, having the data structure 200, which may possibly be one of the auxiliary pieces of information described above (e.g. a basic-payload 260 containing the instruction Write Property and the attributable piece of information X to be overwritten; a basic-payload 260 containing the instruction Reset to Factory Settings and an auxiliary attributable piece of information, which for example only contains an identifier of the addressee component of the instruction encoded in the Tag 224; a basic-payload 260 containing the instruction Set RTC and an auxiliary attributable piece of information, which for example contains an identifier of the addressee component of the instruction encoded in the Tag 224 and a time in the field Data 221; etc.); and transmit it as a value 123 of a characteristic of the service 301, so that the payload 250 will be transmitted as payload 159 of the PDU 153 of a BLE packet 150;

d3) form a payload 250 having at least one basic-payload 260 as described in case d1 and at least one basic-payload 260 as described in case d2; and transmit it as value 123 of a characteristic of the service 301, so that the payload 250 will be transmitted as payload 159 of the PDU 153 of a BLE packet 150;

d4) receive a BLE packet 150 containing in the payload 159 a characteristic of the service 301 which value 123 comprises a payload 250 containing one or more basic-payload(s) 260, which field 261 includes an instruction identifier Notification and which field InfoTag 262 contains one of the attributable pieces of information 210 of another component 11; and take note of the value 221 of such attributable piece of information 210, thus processing the basic-payload(s) 260;

d5) receive a BLE packet 150 containing in the payload 159 a characteristic of the service 301 which value 123 comprises a payload 250 containing one or more basic-payload(s) 260, which field 261 includes an instruction identifier other than Notification and which field Info-Tag 262 contains one of the attributable pieces of information 210 of the component itself (or said Tag 224 All); and execute the instruction identified by the identifier of field 261, thus processing the basic-payload(s) 260; it is noted that in the execution of the instructions, the component 11 may form another or other basic-payload(s) 260 or another or other packet(s) 250, which it transmits as set forth above in cases d1-d3; it is furthermore noted that the execution of the instructions may involve the specific program 280 of the component 11 considered herein or not;

d6) receive a BLE packet 150 containing in the payload 159 a characteristic of the service 301 which value 123 comprises a payload 250 containing one or more basic-payload(s) 260, which field 261 includes an instruction identifier other than Notification and which field Info-Tag 262 contains one of the attributable pieces of information 210 of another component 11 of the bicycle electronic system 10; and transmit said one or more basic-payload(s) 260, as value 123 of a characteristic of the service 301, so that the payload 250 will be transmitted as payload 159 of the PDU 153 of a BLE packet 150, to said other component 11, or to a third component 11 for forwarding to said other component 11;

d7) receive a BLE packet 150 containing in the payload 159 a characteristic of the service 301, which value 123 comprises a payload 250 containing plural basic-payloads 260; subdivide the basic-payloads 260 in two or more second payloads 250; and transmit each second payload 250 as value 123 of a characteristic of the service 301, so that each second payload 250 will be transmitted as payload 159 of the PDU 153 of a respective second BLE packet 150;

d8) receive a BLE packet 150 containing in the payload 159 a characteristic of the service 301, which value 123 comprises a payload 250 containing plural basic-payloads 260; possibly subdivide the basic-payload 260 in two or more second payloads 250; wait the reception of at least one second BLE packet 150 and/or form one or more basic-payload(s) 260; combine one or more basic-payload(s) 260 of the BLE packet 150 under consideration with one or more basic-payload(s) 260 of the at least one second BLE packet 150 and/or with one or more formed basic-payload(s) 260 in at least one third payload 250; and transmit the third payload 250 as value 123 of a characteristic of the service 301, so that each third payload 250 will be transmitted as payload 159 of the PDU 153 of a respective third BLE packet 150;

d9) receive a BLE packet 150 containing in the payload 159 a characteristic of the service 301, which value 123 comprises a payload 250 containing plural basic-payloads 260; execute the instruction(s) of any basic-payload 260 addressed to itself; and proceed with the remaining basic-payload(s) 260 in one or more of the manners described above in cases d4-d8;

d10) combinations of the above.

It is understood that in cases d7, d8, the basic-payloads 260 are grouped or gathered in the payload(s) that the component transmits on the basis of the addressee component, identified by the field Tag 224 and/or on the basis of whether that addressee component is directly connected with the component 11 under consideration or not.

It is noted that the attributable piece of information 210 for each basic-payload 260 of a payload 250 is independently selected from the attributable piece of information 210 for each basic-payload 260 of a payload 250 successively transmitted by the component 11.

It is noted that if a component 11 is part both of the cycling network 30 and of the interacting network 31 or in any case of two different BLE networks, in cases from d4 to d10 it may receive the BLE packets in a network and transmit the BLE packets in the other network. In that case, the component may play a "router" role.

It is worthwhile emphasizing that, in general, a payload or basic-payload may be transmitted on Characteristic A 302 or on Characteristic B 302 independently of the characteristic on which it has been received; or it may be received and/or transmitted on the single characteristic which may be communicated as GATT Client WRITE, GATT Notification or GATT Indication described above.

Furthermore, it will be understood that a component may manage transmission queues and/or may manage transmission priorities.

Those skilled in the art will understand that, in case it is not provided for the payload 250 to be capable of containing plural basic-payloads 260, the above operations are simplified.

A component 11 of the bicycle system 10 which is part of a wireless network and also of a wired network, irrespective of whether in the wireless network it is BLE client 101 (no component in the illustrative system 20), BLE server 101 (as the front derailleur 22-1 of the illustrative system 20) or BLE client-server (as the rear derailleur 21-1 of the illustrative system 20), may perform analogous functions to the above listed functions d1-d9, with the difference that for the transmission of the payloads 250 it uses the BLE architecture 60 and in particular the Characteristic A 302 and/or the Characteristic B 303, as well as the BLE packets 150, in particular the related payloads 159 of the PDU 153, only on the respective wireless connection(s), while on the respective wired connection(s) (in particular, with the smart battery 21-1 or respectively 22-2) it transmits the payloads 250 as payload 291 of a packet 290, having its own overhead 292, according to an adequate protocol.

It is emphasized once more that what is transmitted as value of the Characteristic A 302 and/or of the Characteristic B 303 is not an entire data packet 290 which may be directly transmitted on a wired link, for example with a serial communication protocol, on the contrary containing only the payload 250 formed by the Upper protocol, as payload 291 of a data packet 290.

Those skilled in the art will understand, in the light of the previous description, which changes to make in order to create networks having any physical topology and/or any logical topology, using for example also other roles of the network architecture and/or other communication protocols, allowing for example Mesh networks to be created.

EXAMPLES

Without detracting from generality and only for the purpose of a greater clarity of presentation, hereinbelow some simple examples of communication according to both the above-described communication Upper protocol and Lower protocol are briefly described with reference to the illustrative system 20. For the sake of brevity, a simplified nomenclature will be used, which is in any case believed to be clear in the light of the previous description.

In the data flow schematized in the figures, only the components 21-24, 29 of the illustrative system 20 which are involved in the data communication of at least one example are shown, the instrumented crankarms 25, 26 and the wearable control devices 27, 28 being on the other hand omitted.

In the examples, it is assumed that all the components 20 of the illustrative system have already performed the Discovery phase and thus know the Server services 301 (all equal to each other) of the various components which are BLE servers 101 (21-1, 22-1, 23, 24); it is furthermore assumed, for the sake of simplicity, that all the components 20 of the illustrative system store in memory the attributable pieces of information 210 to which each example refers.

Example 1

Figure 13:
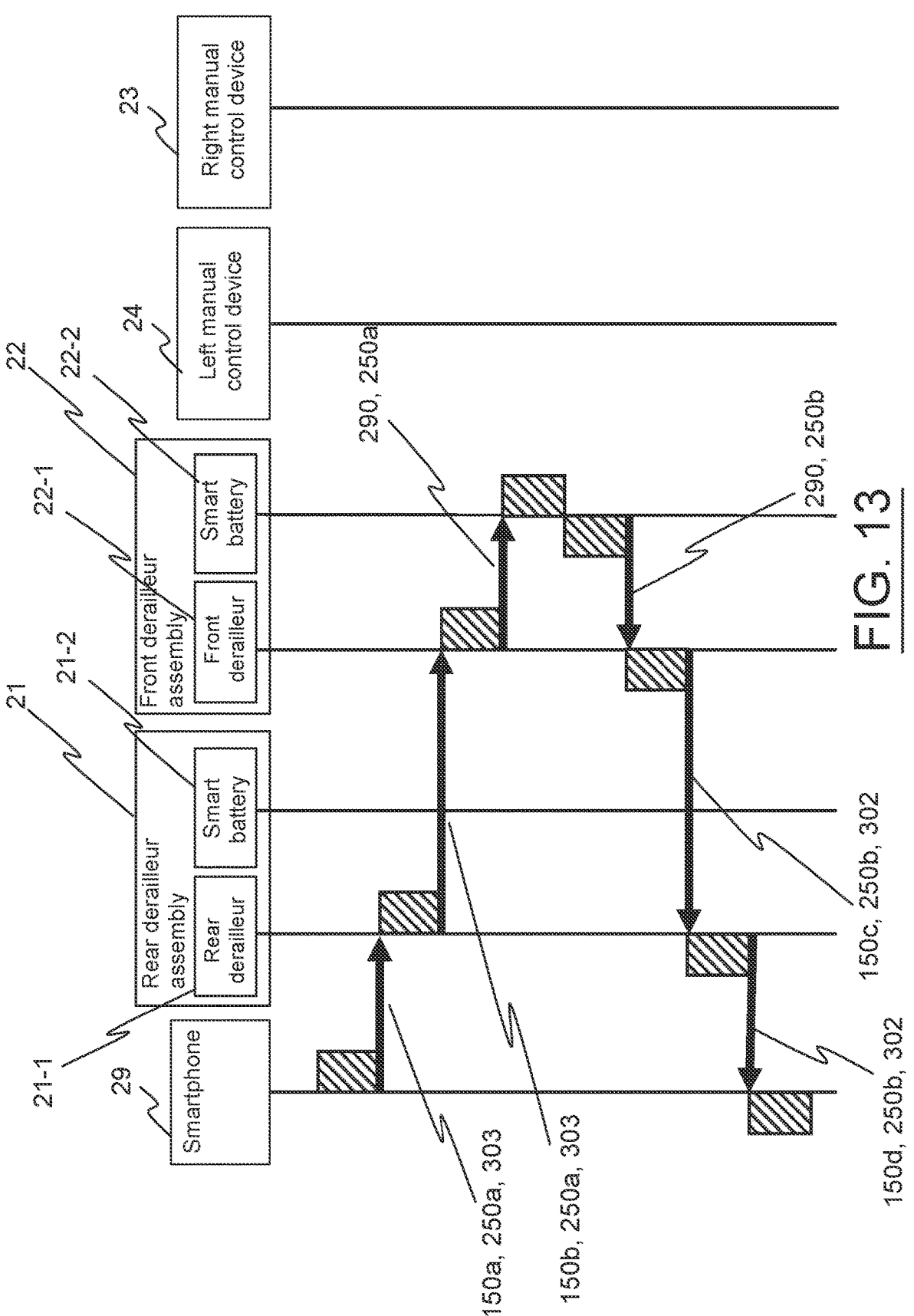

In FIG. 13 there is shown the data flow exchanged in the illustrative system 20 in order to actuate an explicit reading request, by the smartphone 29, of the voltage of the smart battery 22-2 of the front derailleur assembly 22, for example in order to display it to a user on its own display.

The smartphone 29 forms a single basic-payload 260 with instruction identifier (field 261) Read Property and InfoTag 262 corresponding to an attributable piece of information 210 of the smart battery 22-2, called herein Battery Voltage, having the data structure 200. In particular, Tag 224 identifies that attributable piece of information 210, field Len 222 has a null value and field Data 221 is absent.

The smartphone 29 forms a first BLE packet 150*a* with, in the payload 159, the Characteristic B 303, which value 123 corresponds to a payload 250*a* containing said single basic-payload 260.

The first BLE packet 150*a* is transmitted from the smartphone 29, BLE client, to the derailleur 21-1 of the rear derailleur assembly 21, BLE server, in the interacting network 31 (through a GATT Client WRITE 105).

Upon receipt thereof, the rear derailleur 21-1, recognizing that it is not the addressee of the instruction Read Property based on the Tag 224, forms a second BLE packet 150*b* with, in the payload 159, the Characteristic B 303, which value 123 corresponds again to the same payload 250*a*, and transmits it on the cycling network 30, of which it is BLE client, towards the front derailleur assembly 22, BLE server, and specifically to the front derailleur 22-1.

Upon receipt thereof, the front derailleur 22-1 transmits the payload 250*a*, extracted from the second BLE packet 150*b*, to its smart battery 22-2 on their wired link (electric contacts), as payload 291 of a packet 290 adding an overhead 292 thereto, through a suitable transmission protocol in the lower layers 52-54 of the architecture 50 of the wired network, for example a serial transmission protocol.

Upon receipt thereof, the smart battery 22-2 forms a second payload 250*b* with a single basic-payload 260, with instruction identifier Notification (field 261) and InfoTag 262 corresponding to the same attributable piece of information 210 Battery Voltage, namely having the same Tag 224, but with the current value of the battery voltage in field Data 221.

The smart battery 22-2 transmits the second payload 250*b* to the front derailleur 22-1 on their wired links (electric contacts) as payload 291 of a packet 290 having overhead 292.

Upon receipt thereof, the front derailleur 22-1 forms a third BLE packet 150*c* with, in the payload 159, the Characteristic A 302, which value 123 corresponds to the received payload 250*b*, 291, but does not include the overhead 292, and transmits the third BLE packet 150*c*, as BLE server, to the rear derailleur assembly 21, BLE client, specifically to its derailleur 21-1 (through a GATT Notification 107 or a GATT Indication 108).

Upon receipt thereof, the rear derailleur 21-1 forms, as BLE server, a fourth BLE packet 150*d* with, in the payload

159, the Characteristic A 302, which value 123 corresponds to the same received payload 250*b*, and transmits it to the smartphone 29, BLE client, on the interacting network 31.

Example 2

Figure 14:
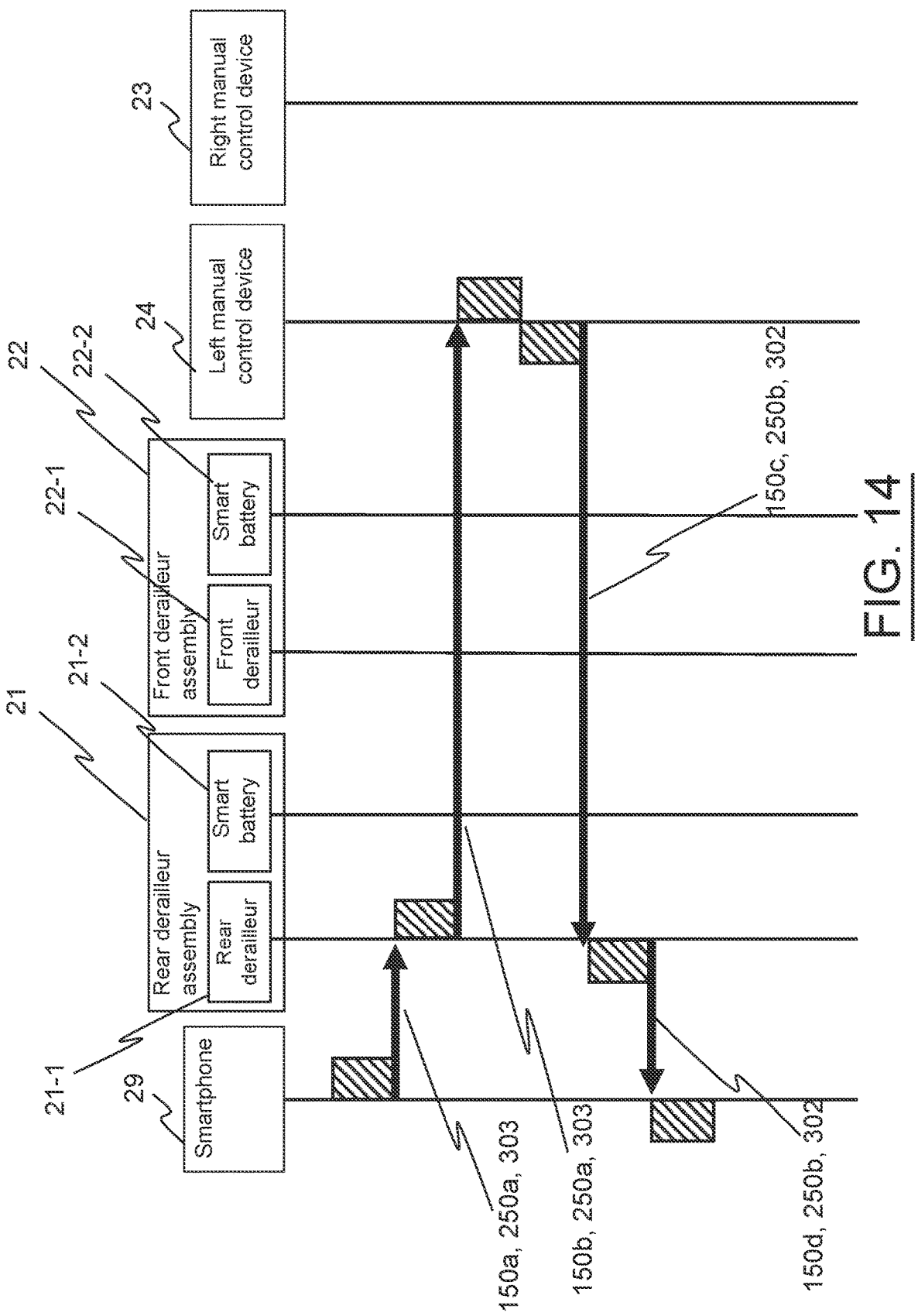

In FIG. 14 there is shown the data flow exchanged in the illustrative system 20 in order to actuate the writing (modification) of the value of a delay time threshold on the left control device 24, by the smartphone 29, for example based on a value inserted by the user through its touch screen.

The smartphone 29 forms a payload 250*a* having a single basic-payload 260, including an instruction identifier Write Property (field 261) and InfoTag 262 corresponding to an attributable piece of information 210 of the left control device 24 (addressee component of the instruction), called herein Delay Threshold, having the data structure 200. In particular, the Tag 224 identifies that attributable piece of information 210 and the field Data 221 contains the value to be assigned to the delay time threshold. The smartphone 29 forms a first BLE packet 150*a* with the Characteristic B 303, which value 123 corresponds to the payload 250*a*.

The BLE packet 150*a* is transmitted from the smartphone 29, BLE client, to the derailleur 21-1 of the rear derailleur assembly 21, BLE server, in the interacting network 31.

Upon receipt thereof, the rear derailleur 21-1, recognizing that it is not the addressee of the instruction, forms a second BLE packet 150*b* with the Characteristic B 303, which value 123 corresponds again to the same payload 250*a*, and transmits it on the cycling network 30, as BLE client, to the left control device 24, BLE server.

Upon receipt thereof, the left control device 24, after having modified its own Delay Threshold and thus having executed the instruction, forms a second payload 250*b*, with a single basic-payload 260, with instruction identifier Notification (field 261) and InfoTag 262 corresponding to the same attributable piece of information 210 Delay Threshold, namely having the same Tag 224, identifier in this case of the addresser component, and with the current value of the delay threshold in the field Data 221.

The left control device 24 forms a third BLE packet 150*c* with the Characteristic A 302, which value 123 corresponds to the payload 250*b*, and transmits the third BLE packet 150*c*, as BLE server, to the rear derailleur assembly 21, BLE client.

Upon receipt thereof, the rear derailleur assembly 21, specifically its derailleur 21-1, forms, as BLE server, a fourth BLE packet 150*d* with the Characteristic A 302, which value 123 corresponds to the same received payload 250*b*, and transmits it to the smartphone 29, BLE client, on the interacting network 31.

Alternatively, the second payload 250*b* may contain for example an instruction Write Confirmation in field 261 and null InfoTag 262 or only bearing the Tag 224 of the attributable piece of information 210 Delay Threshold. Still alternatively, the left control device 24 may not form any payload 250*b*, just executing the instruction without replying.

Example 3

Figure 15:
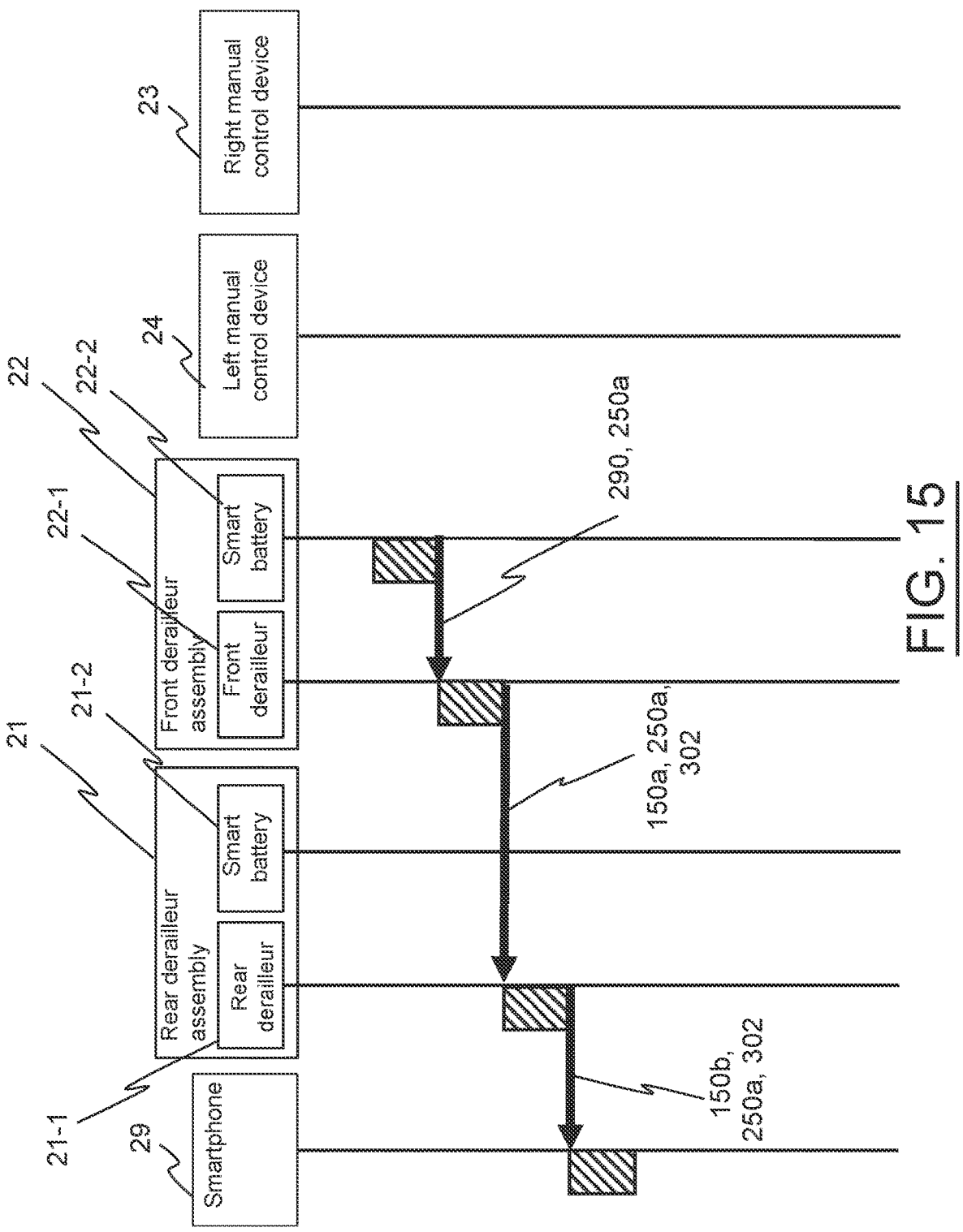

In FIG. 15 there is shown the dataflow exchanged in the illustrative system 20 in order to actuate a spontaneous transmission (notification) of the charge level of the smart battery 22-2 of the front derailleur assembly 22 to the smartphone 29, for example in order to display it to a user on its own display, for example because it has changed or for a periodic update of the displayed data, etc.

The smart battery 22-2 forms a payload 250*a* with a single basic-payload 260, with instruction identifier Notification (field 261) and InfoTag 262 corresponding to its attributable piece of information 210 Charge Level, with the current value of the battery charge level in field Data 221.

The smart battery 22-2 transmits the payload 250*a* to the front derailleur 22-1 on their wired link (electric contacts) as payload 291 of a packet 290, having its own overhead 292.

Upon receipt thereof, the front derailleur 22-1 forms a BLE packet 150*a* with the Characteristic A 302, which value 123 corresponds not to the entire received packet 290, rather only to the received payload 250*a*, and transmits the BLE packet 150*a*, as BLE server, to the rear derailleur assembly 21, BLE client, specifically to its derailleur 21-1.

Upon receipt thereof, the rear derailleur 21-1 forms, as BLE server, a second BLE packet 150*b* with the Characteristic A 302, which value 123 corresponds to the same received payload 250*a*, and transmits it to the smartphone 29, BLE client, on the interacting network 31.

Example 4

Figure 16:
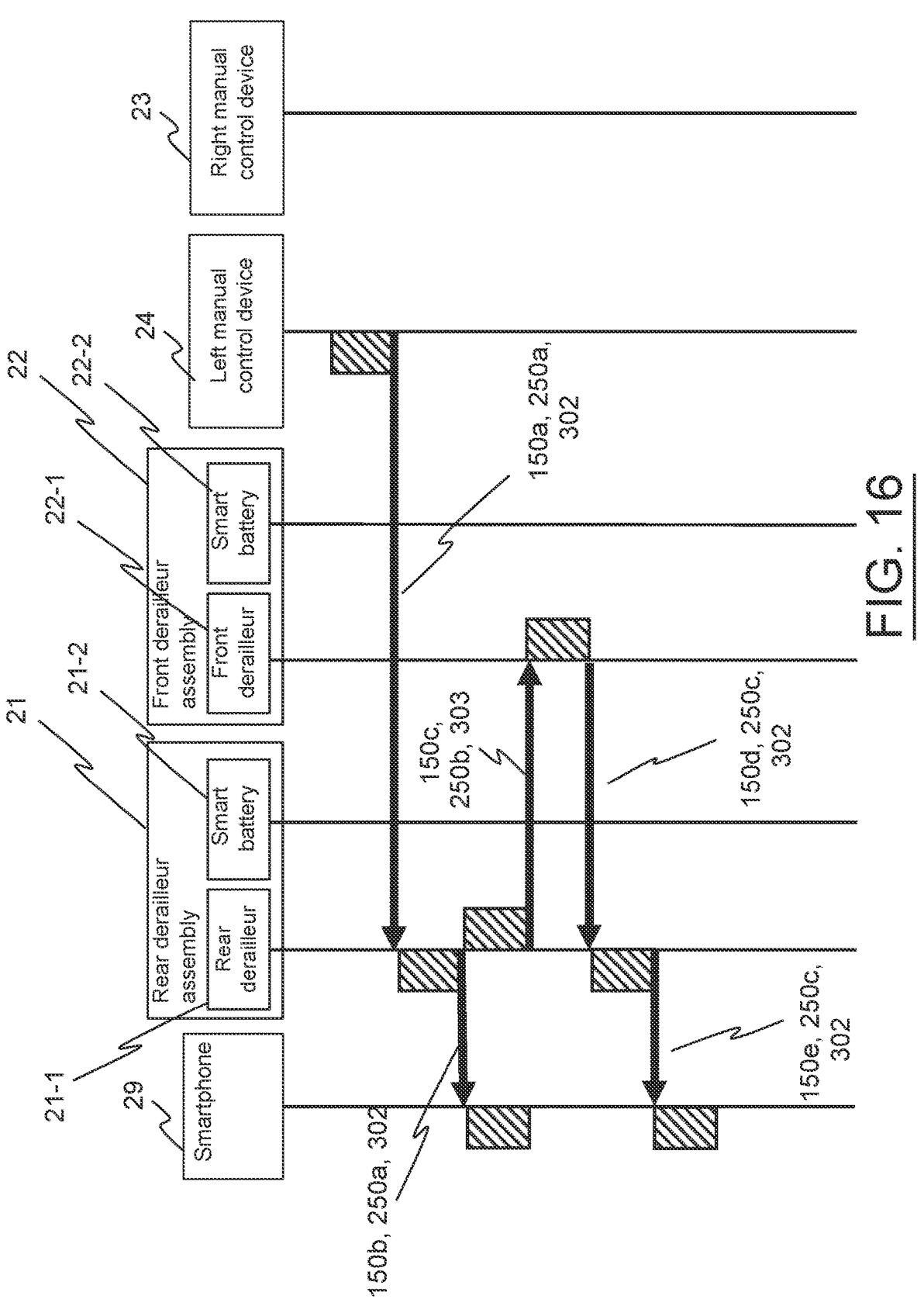

In FIG. 16 there is shown the dataflow exchanged in the illustrative system 20 in order to actuate a shifting command for the front derailleur assembly 22, input through the left manual control device 24.

The left manual control device 24 forms, for example upon displacement of a lever thereof intended for upshift commands, a payload 250*a* with a single basic-payload 260, including instruction identifier (field 261) Notification and InfoTag 262 corresponding to its attributable piece of information 210 Lever Event, having the data structure 200, with value (field Data 221) identifying the specific lever.

The left manual control device 24 forms, as BLE server, a first BLE packet 150*a* with the Characteristic A 302, which value 113 corresponds to the payload 250*a*, and transmits it to the rear derailleur assembly 21, BLE client, specifically to its derailleur 21-1.

Upon receipt thereof, the rear derailleur 21-1 optionally forms, as BLE server, a second BLE packet 150*b* with the Characteristic A 302, which value 123 corresponds to the same received payload 250*a*, and transmits it to the smartphone 29, BLE client, on the interacting network 31, for example for the purpose of data collection (data logger).

The rear derailleur 21-1 forms a second payload 250*b* with a single basic-payload 260 with instruction identifier Shift Up (field 261) and InfoTag 262 corresponding to an attributable piece of information 210 of the front derailleur 22, having the data structure 200, for example wherein the Tag 224 identifies the front derailleur 22 and the field Data 221 is null.

The rear derailleur 21-1 forms a third BLE packet 150*c* with the Characteristic B 303, which value 123 corresponds to the second payload 250*b*, and transmits it, on the cycling network 30, as BLE client, to the front derailleur assembly 22, BLE server.

Upon receipt thereof, the front derailleur assembly 21 actuates the gearshift and forms a third payload 250*c* containing three basic-payloads 260:

one containing an instruction identifier Notification (field 261), InfoTag 262 corresponding to its attributable piece of information 210 Index of toothed wheel, and a value (field Data 221) identifying the specific toothed wheel on which the front derailleur 22 is engaged, one containing an instruction identifier Notification (field 261), InfoTag 262 corresponding to its attributable piece of information 210 Gearshift counter, and a value (field Data 221) equal to the effective number of effected gearshifts, e.g. since exit from the factory, one containing an instruction identifier Notification (field 261), InfoTag 262 corresponding to its attributable piece of information 210 Motor position, and a value (field Data 221) equal to the actual position of the motor, e.g. in arbitrary units, wherein the three Info-Tags have the data structure 200.

The front derailleur assembly 22 forms, as BLE server, a fourth BLE packet 150*d* with the Characteristic A 302, which value 123 corresponds to the payload 250*c*, and transmits the fourth BLE packet 150*d*, as BLE server, to the rear derailleur assembly 21, BLE client, specifically to its derailleur 21-1.

Upon receipt thereof, the rear derailleur 21-1 forms, as BLE server, a fifth BLE packet 150*e* with the Characteristic A 302, which value 123 corresponds to the same received payload 250*c*, and transmits it to the smartphone 29, BLE client, on the interacting network 31, for example again for the purpose of data logging.

It is noted that, alternatively, the left manual control device 24 may generate directly a payload with instruction identifier Shift Up (field 261) and InfoTag 262 corresponding to an attributable piece of information 210 of the front derailleur 22, that the rear derailleur 22-1, recognizing that it is not the addressee of the instruction, just forwards to the front derailleur 22. In this case, therefore, the payload 250*a* is received and forwarded by the rear derailleur 22-1 always in its role of BLE client 102, changing the characteristic used (from Characteristic A to Characteristic B).

Example 5

Figure 17:
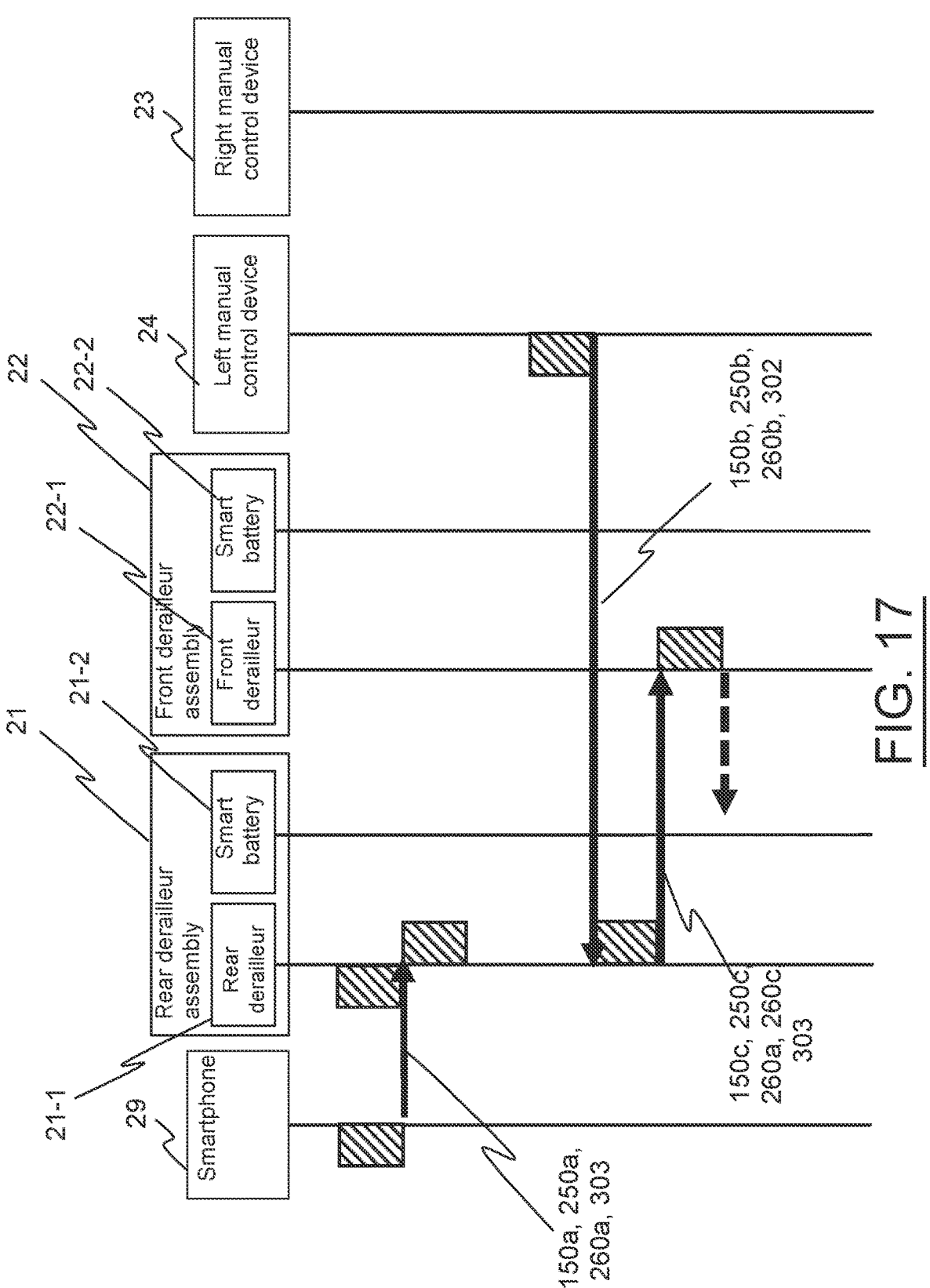

In FIG. 17 there is shown the dataflow exchanged in the illustrative system 20, which emphasizes how basic-payloads 260 may be combined by a component 11, specifically the rear derailleur 21-1, for example for the purpose of managing transmission priority and/or queues.

The rear derailleur 21-1 receives, as BLE server on the interacting network 31, a first BLE packet 150*a*, formed and transmitted by the smartphone 29, BLE client. The first BLE packet 150*a* contains in its payload 159 the Characteristic B 303, which value 123 corresponds to a first payload 250*a* having a first basic-payload 260*a*.

The first basic-payload 260*a* contains an instruction Read (field 261) Software Version of the front derailleur (InfoTag 262).

The rear derailleur 21-1 considers that the request has no priority and does not react immediately.

The rear derailleur 21-1 then receives, as BLE client on the cycling network 30, a second BLE packet 150*b*, formed and transmitted by the left manual control device 24, BLE server. The second BLE packet 150*b* contains in its payload 159 the Characteristic A 302, which value 123 corresponds to a second payload 250*b* having a second basic-payload 260*b* containing an instruction Lever Event and identification of the specific lever in the field Data 221 (cf. BLE packet 150*a* of Example 4).

The rear derailleur 21-1 forms a third payload 250*c* with two basic-payloads: the basic-payload 260*a* received from the smartphone 29 and a basic-payload 260*c* formed by itself, related to the instruction Shift Up of the front derailleur 22 (cf. BLE packet 150*c* of Example 4).

The rear derailleur 21-1 forms a third BLE packet 150c with the Characteristic B 303, which value 123 corresponds to the third payload 250c and transmits it, on the cycling network 30, as BLE client, towards the front derailleur assembly 22, BLE server.

Example 6

Figure 18:
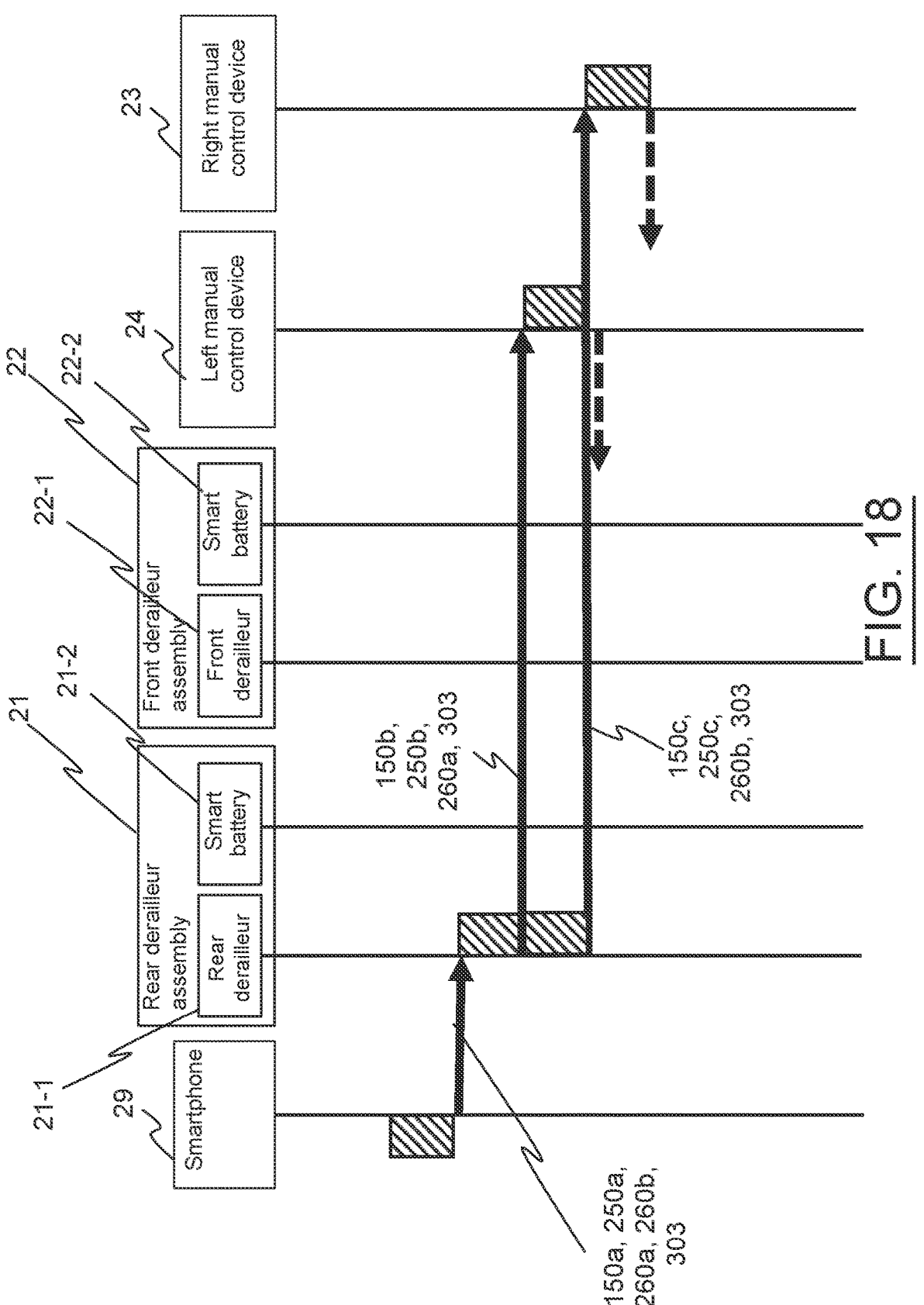

In FIG. 18 there is shown the dataflow exchanged in the illustrative system 20, which emphasizes how the basic-payloads 260 may be sorted by a component 11, specifically the rear derailleur 21-1.

The rear derailleur 21-1 receives, as BLE server on the interacting network 31, a first BLE packet 150a, formed and transmitted by the smartphone 29, BLE client. The first BLE packet 150a contains in its payload 159 the Characteristic B 303, which value 123 corresponds to a first payload 250a having two basic-payloads 260a, 260b.

The first basic-payload 260a contains an instruction Write Property (field 261) related to the Delay Threshold of the left control device 24 (Cf. first payload 250a of Example 2).

The second basic-payload 260b similarly contains an instruction Write Property (field 261) related to the Delay Threshold of the right control device 23.

The rear derailleur 21-1 forms a second payload 250b with only the basic-payload 260a; forms a second BLE packet 150b with the Characteristic B 303, which value 123 corresponds to the second payload 250b, and transmits it, on the cycling network 30, as BLE client, towards the left control device 24, BLE server.

The rear derailleur 21-1 forms a third payload 250c with only the basic-payload 260b; forms a third BLE packet 150c with the Characteristic B 303, which value 123 corresponds to the third payload 250c, and transmits it, on the cycling network 30, as BLE client, towards the right control device 23, BLE server.

Additional Observations

The bicycle electronic system may comprise less components than shown and, in a minimum configuration sufficient for implementing at least some of the communication methods or protocols disclosed herein, it may comprise two components 11. Merely by way of example a bicycle electronic system is mentioned, comprising just a derailleur or other controllable device and a manual control device intended for controlling it; or comprising a derailleur and a component embodying a controller or processor configured to automatically control the derailleur, for example based on one or more quantities detected by one or more detector devices thereof, for example based on the detected speed; etc.

Those skilled in the art will understand, in the light of the previous description, which changes to make in order to create networks having any physical topology and/or any logical topology, using for example also other roles of the network architecture which allow for example Mesh networks to be created.

Those skilled in the art will appreciate that some aspects of the communication methods or protocols described above allow remarkable advantages to be obtained, just as the associated bicycle systems and components, computer programs and readable means. Said aspects, even if they have been described in a more specific context, should be considered new and inventive per se, also in more general contexts and independently of any other detail provided in the context wherein they have been disclosed.

An example of aspects which are innovative also independently of any other detail provided in the context wherein they have been disclosed relates to the fact that, thanks to the possibility of grouping together, as value of a characteristic of a BLE service, plural basic-payloads each containing pieces of information attributable to, and thus attributable pieces of information of, one or more components, it is possible to remarkably reduce the Discovery time and/or the network traffic with respect to a conventional implementation according to the BLE standard, in particular in the case of a high data volume which needs to be transmitted.

This may entail a reduction of the communication latency times and/or of the response times to the requests of data exchange, which may include requests for executing manual or automatic commands which determine the functionality of the bicycle components like the derailleur assemblies 21, 22, what is of remarkable importance also from the safety point of view.

This independently, for example, of the specific format of the basic-payload 260 described above with reference to FIGS. 4-5, from the specific format of each of its fields, and from the specific protocol used in the lower layers 52-54, 62-63 of the network architecture 50, 60 for its transmission.

In order to appreciate also in quantitative terms the advantages that may be obtained, consider merely by way of non-limiting example that a configuration of the bicycle electronic system 10 corresponding to the illustrative system 20 may be modelled with a total number of a few hundreds if not thousands of attributable pieces of information, thus to a level of detail unattainable, at least in practice, with conventional implementations based on BLE architecture.

Experimental test related to a configuration of the bicycle electronic system 10 corresponding to the illustrative system 20 wherein both the Upper protocol (basic-payload 260) and the Lower protocol (service Serial 301 of FIG. 12) are implemented, with a hundred of attributable pieces of information, allowed a reduction of the duration of the Discovery phase of at least two orders of magnitude to be detected, a reduction that improves in a substantially linear manner as the attributable pieces of information increase, passing to tens of milliseconds, with respect to a few seconds in a conventional implementation based on the BLE architecture (and thus the use of BLE services with a BLE Characteristic dedicated to each piece of information specific of each system component).

Also in case a step of identifying the entirety of the attributable pieces of information of the various system components is necessary, the above-mentioned grouping capability allows a certain time saving to be obtained.

Another example of aspects which are innovative also independently of any other detail provided in the context wherein they have been disclosed relates to the fact that, through a characteristic of a service of a GATT server of a BLE network architecture, as value (123) of the characteristic a payload is sent, comprising a unique identifier of the attributable piece of information, which can be traced back to the addresser component or to the addressee component in virtue of its univocity, as well as an identifier of an instruction, executable by a component that is addressee of the instruction.

In this manner it is possible to communicate an even very large number of instructions whatsoever and/or an even very large number of data exploiting the BLE technology, but without the need to define GATT services with a very large number of characteristics.

Furthermore, it is possible to make an instruction easily travel between two system components which are not directly connected.

The receiving component distinguishes whether the payload is intended therefor or not based on the instruction and/or on the identifier of the attributable piece of information, in the first case executing the instruction and in the second case forwarding the payload to the addressee component or to a different component to which the addressee component is directly or indirectly connected.

It is furthermore possible, analogously to what has been described above, to reduce the latency times in the Discovery phase.

For a quantitative indication of the advantages that may be attained in terms of network traffic, what has been highlighted above is referred to.

Another example of aspects which are innovative also independently of any other detail provided in the context wherein they have been disclosed relates to the fact that, as emphasized above, a BLE Characteristic transmitted in a BLE packet is used to transmit only the payload 250 formed in the Upper protocol, not a true data packet, which would instead also have a transmission overhead, namely addressing fields, transmission control fields, etc., thus sparing traffic in the BLE network.

In that manner, the payload 250 may travel unchanged also on plural links of a same network or on links of different networks, among plural components.

In particular, the payload 250 may be transferred unchanged between a BLE packet as value of BLE Characteristic and a packet of a communication protocol other than BLE.

This differs from implementations wherein two BLE characteristics are used, specifically a GATT Notification and a GATT Client WRITE, in order to create two communication channels according to a serial protocol, on which exactly all the traffic of the serial protocol is transmitted, namely the entire packet.

In particular, in the interaction mode between the Upper protocol and the Lower protocol disclosed herein, there is no duplication of information, in that it is not necessary to add any overhead with respect to that provided for by BLE.

The payload 250 may be, analogously, transferred unchanged between a first BLE packet as value of BLE Characteristic and a second BLE packet as value of a second BLE Characteristic, in a same BLE network or in two different BLE networks.

It is noted that, also thanks to the fact that said payload 250 formed in the Upper protocol comprises an identifier (Tag 224) which is unique in the bicycle electronic system 10, the payload does not need to be bound to a specific addresser field or to a specific addressee field.

Another example of aspects which are innovative also independently of any other detail provided in the context wherein they have been disclosed relates to the fact that the attributable pieces of information of a specific component of the bicycle electronic system (in the illustrative system 20 a smart battery 21-2, 22-2) is communicated in the BLE network through a different component (in the illustrative system 20 a derailleur 21-1, 22-1), with which said specific component has, on the contrary, a non-BLE connection.

In the conventional BLE system modelling, each component is connected in the BLE network and is modelled with its own set of characteristics. It is noted that the components capable of communicating are considered herein, it is therefore not a matter of modelling a component unable to communicate in a component capable of communicating.

This provision allows the number of network links to be reduced, in that said specific component may also be connected only to said different component, delegating to said different component the communication with the rest of the system.

Said different component may possibly communicate in the BLE network also its own attributable pieces of information.

Another example of aspects which are innovative also independently of any other detail provided in the context wherein they have been disclosed relates to the fact that an attributable piece of information which is communicated as payload of a characteristic of the service 301 comprises a field value 221 wherein each bit or group of bits is indicative of a respective basic piece of information, the basic pieces of information of the attributable piece of information being candidate to joint communication in the bicycle electronic system.

For example, a data type "device status" may gather some basic information of a component, for example the presence of one or more errors of various kinds, the status of battery being charged, the status of network being established, when one or more preset bit(s) of its value are set to a preset Boolean value (for example to 1) possibly in association, for example, with an active mode among a small number of modes.

By providing, in this manner, for a "containers-like" approach in the modelling of the bicycle electronic system it is possible, among other things, to assist the programming, to spare the overall number of unique identifiers associated with the attributable pieces of information, possibly shortening the related string of bits and thus reducing network traffic.

It is also observed that, when the provision is used in connection with the above-described possibility of grouping plural basic-payloads of the Upper protocol in the Lower protocol, one arrives at a hierarchical two-level structure of the attributable pieces of information, further reducing network traffic.

Another example of aspects which are innovative also independently of any other detail provided in the context wherein they have been disclosed relates to modelling a bicycle electronic system through a plurality of attributable pieces of information to/of system components, which are uniquely identified in the entire system, and communicating through a characteristic of a GATT service of a GATT server of a BLE network architecture, a payload (250) comprising an identifier of attributable piece of information of a component.

This differs from conventional implementations according to BLE, wherein on the contrary similar characteristics have the same identifier, for example all battery voltages are identified by one and a same identifier (for example, by a 16-bit UUID defined by SIG) and are only distinguished in that they are communicated between two specific components, in a specific BLE packet, in which overhead 152 there is an address of the addressee component. Through the use of the unique identifier disclosed herein, on the other hand, the payload may travel unchanged also on plural links of a same BLE network or on links of different BLE networks, among plural components.

The identifier of attributable piece of information of a component may be communicated together with an associated instruction in a payload.

The payload may be communicated in the lower sub-level 51-1, 61-1 of the Application level 51 of the ISO/OSI model 50 or of the uppermost level of the network architecture, in particular of the Application level 61 of the BLE network architecture 60 or BLE standard, and is formed in a sub-level 51-2, 61-2 of that Application level 51 of the ISO/OSI model 50 or uppermost level of the network architecture, in particular Application level 61 of the BLE standard 60 higher than said lower sub-level.

Said Application level 51 of the ISO/OSI model 50 or uppermost level of the network architecture, in particular Application level 61 of the BLE standard 60, may comprise an uppermost sub-level 51-3, 61-3 higher than the sub-level 51-2, 61-2 wherein the payload 250 is formed.

An application program may be provided for in the uppermost sub-level 51-3, 61-3, which exploits the Upper protocol and the Lower protocol described above.

Another example of aspects which are innovative also independently of any other detail provided in the context wherein they have been disclosed relates to the fact that, in a bicycle electronic system wherein each component has zero or more pieces of information attributable thereto and candidate to communication within the system—through a BLE Characteristic—, the attributable pieces of information being uniquely identified in the entire system, an attributable piece of information of a first component models, instead, a given datum relative to a second component.

This datum may be selected from the group consisting of a parameter or variable or constant of a specific program of the second component, a status variable of the second component; a measurement taken by the second component; a given identifier of the second component; and a given identifier of a specific program of the second component.

Because in this manner the inherent or natural belonging of the attributable piece of information may be inverted, for example defining an attributable piece of information of a component X as "position of the motor of the component Y", the versatility of the system is increased because there are less obligations in the modelling, and it is possible to also model components having few memory resources which may be allocated to respective attributable pieces of information.

Those skilled in the art will understand, in the light of the present description, how to implement the communication, transmission and/or reception methods or protocols described herein in any configuration of the bicycle electronic system 10 described above in general terms, as well as in the related bicycle or cycling electronic components, bicycle electronic systems, computer programs, computer readable means and/or communication networks, which should be considered as further aspects of the subject-matter disclosed herein.

Those skilled in the art will understand that the various aspects described above may be combined with each other, as are also the respective dependent features.

Those skilled in the art will understand that some dependent features only described in the context of a specific aspect for the sake of brevity also apply to other aspects.

Other features that apply to one or more of the above aspects comprise the following ones.

At least one and preferably each component being a BLE server exposes at least one and preferably a single GATT service.

Said at least one and preferably a single GATT service comprises at least one and preferably a single characteristic suitable to be communicated through GATT Notification or GATT Indication and/or at least one and preferably a single characteristic suitable to be communicated through GATT Client WRITE and/or at least one and preferably a single characteristic suitable to be communicated through GATT Notification or GATT Indication or GATT Client WRITE.

At least one component of the bicycle electronic system is connected, and preferably is BLE client, in at least one first BLE network with at least one second system component, and is connected, and preferably is BLE server, in at least one second BLE network with at least one third system component, equal to or different from said at least one second component.

When said at least one third system component is different from said at least one second component, said at least one component may be configured to interface said at least one first BLE network and said at least one second BLE network in the transmission of the payloads.

The components of the bicycle electronic system may comprise cycling specific electronic devices.

The components of the bicycle electronic system may further comprise general-purpose electronic devices configured to interact with one or more of the cycling specific electronic devices.

The components of the bicycle electronic system may be selected from the group consisting of the several devices shown in FIG. 1.

The components of the bicycle electronic system may comprise: a right manual control device, a left manual control device, a front derailleur, a rear derailleur.

The components of the bicycle electronic system may preferably further comprise a crankarm on the transmission side and/or a crankarm on the side opposite to the transmission side and/or at least one wearable control device.

The right manual control device, the left manual control device, the front derailleur, the rear derailleur and the optional crankarm on the transmission side and/or crankarm on the side opposite to the transmission side and/or at least one wearable control device may be connected in a first BLE network having a single central, master BLE, which is preferably the rear derailleur.

The components of the bicycle electronic system may further comprise at least one general-purpose electronic device provided with a graphical user interface.

Said at least one general-purpose electronic device may be connected in a second BLE network with the component of the first BLE network which is said single central, master BLE.

The invention claimed is:

1. A bicycle-implemented transmission method, applied in a transmitter electronic component of a bicycle electronic system, the bicycle electronic system further comprising at least one receiver electronic component, each electronic component of the bicycle electronic system having zero or more pieces of information attributable thereto and candidate to communication within the bicycle electronic system, each of said attributable pieces of information comprising an identifier which is unique in the bicycle electronic system, the bicycle-implemented transmission method comprising:

i) forming, in the transmitter electronic component, a payload, said forming the payload comprising:

forming a plurality of basic-payloads, each containing at least the unique identifier of a respective one of said attributable pieces of information, each basic-payload further comprising an identifier of an instruction executable by an addressee component, and grouping together said plurality of basic-payloads in the payload; and ii) transmitting the payload from said transmitter electronic component to said at least one receiver electronic component as value of a characteristic of a Bluetooth Low Energy (BLE) service of a Generic Attribute Profile (GATT) server of a BLE network architecture.

2. The bicycle-implemented transmission method according to claim 1, wherein said value is devoid of transmission overhead.

3. The bicycle-implemented transmission method according to claim 1, wherein the attributable piece of information for each basic-payload of the payload is selected independently of the attributable piece of information for each basic-payload of a subsequent payload subsequently transmitted by the transmitter electronic component.

4. The bicycle-implemented transmission method according to claim 1, wherein the transmitting the payload is performed in a first sub-level of an application level of the BLE network architecture, and the forming the payload is performed in a second sub-level of the application level of the BLE network architecture, said second sub-level being higher than said first sub-level.

5. The bicycle-implemented transmission method according to claim 4, wherein the application level of the BLE network architecture comprises a third sub-level higher than the second sub-level.

6. The bicycle-implemented transmission method according to claim 1, wherein the basic-payloads of the payload comprise unique identifiers of attributable pieces of information of at least two different electronic components of the bicycle electronic system, not necessarily including said transmitter electronic component and/or said at least one receiver electronic component.

7. The bicycle-implemented transmission method according to claim 1, wherein a number of basic-payloads of a payload is variable from payload to payload.

8. The bicycle-implemented transmission method according to claim 1, wherein at least one basic-payload further comprises a field value of attributable piece of information containing at least two bits or at least two groups of bits, respectively relative to at least two different properties of the component to which the attributable piece of information pertains, not necessarily including said transmitter electronic component and/or said at least one receiver electronic component.

9. The bicycle-implemented transmission method according to claim 1, wherein the characteristic of the BLE service is communicated through a GATT Notification or a GATT Indication when the transmitter electronic component is a BLE server and/or through a GATT Client WRITE when the transmitter electronic component is a BLE client.

10. A cycling electronic component configured to perform the bicycle-implemented transmission method of claim 1.

11. A bicycle-implemented reception method, applied in a receiver electronic component of a bicycle electronic system, the bicycle electronic system further comprising at least one transmitter electronic component, each component of the bicycle electronic system having zero or more pieces of information attributable thereto and candidate to communication within the bicycle electronic system, each of said attributable pieces of information comprising an identifier which is unique in the bicycle electronic system, the bicycle-implemented reception method comprising:

receiving, in the receiver component, a payload from said at least one transmitter electronic component as value of a characteristic of a Bluetooth Low Energy (BLE) service of a Generic Architecture Profile (GATT) server of a BLE network architecture, and extracting from said payload a plurality of basic-payloads, each containing the unique identifier of a respective one of said attributable pieces of information and an identifier of an instruction executable by an addressee component.

12. The bicycle-implemented reception method according to claim 11, wherein said receiver electronic component distinguishes whether the instruction of each basic-payload is addressed to itself or not based on the instruction identifier and/or on the unique identifier of the attributable piece of information.

13. The bicycle-implemented reception method according to claim 11, further comprising at least one of:

i) processing one or more of said plurality of basic-payloads of which the receiver electronic component is an addressee;

ii) transmitting one or more of said plurality of basic-payloads to an electronic component of the bicycle electronic system that is distinct from the receiver electronic component and the at least one transmitter electronic component;

iii) subdividing said plurality of basic-payloads in two or more second payloads and transmitting each second payload to a respective electronic component of the bicycle electronic system that is distinct from the receiver electronic component and the at least one transmitter electronic component; or iv) waiting for the reception of at least one second payload, combining one or more of said plurality of basic-payloads of the payload with one or more basic-payloads of the at least one second payload into at least one third payload, and transmitting the third payload to a electronic component of the bicycle electronic system that is distinct from the receiver electronic component and the at least one transmitter electronic component;

v) forming one or more basic-payloads, combining one or more of said plurality of basic-payloads of the payload with one or more of thus formed basic-payloads into at least one third payload, and transmitting the at least one third payload to a electronic component of the bicycle electronic system that is distinct from the receiver electronic component and the at least one transmitter electronic component; or vi) waiting for the reception of at least one second payload, forming one or more basic-payloads, combining one or more of said plurality of basic-payloads of the payload with one or more basic-payloads of the at least one second payload and with one or more of thus formed basic-payloads into at least one third payload, and transmitting the at least one third payload to a electronic component of the bicycle electronic system that is distinct from the receiver electronic component and the at least one transmitter electronic component.

14. The bicycle-implemented reception method according to claim 13, wherein transmitting comprises transmitting a payload:

i) as a further value of the or a further characteristic of the or a further BLE service, or ii) as payload of a data packet according to a communication protocol other than BLE, the data packet further having a communication overhead.

15. A cycling electronic component configured to perform the bicycle-implemented reception method of claim 11.

16. A bicycle electronic system comprising at least one transmitter electronic component and at least one receiver electronic component, each said component having zero or more pieces of information attributable thereto and candidate to communication within the bicycle electronic system, each of said attributable pieces of information comprising an identifier which is unique in the bicycle electronic system, wherein the at least one transmitter electronic component is configured to:

form a plurality of basic-payloads, each containing at least the unique identifier of a respective one of said attributable pieces of information, each basic-payload further comprising an identifier of an instruction executable by an addressee component, group together said plurality of basic-payloads in a payload; and transmit the payload from said at least one transmitter electronic component to said at least one receiver electronic component as value of a characteristic of a Bluetooth Low Energy (BLE) service of a Generic Attribute Profile (GATT) server of a BLE network architecture, and wherein the at least one receiver electronic component is configured to:

receive the payload from said at least one transmitter electronic component, and extract from said payload the plurality of basic-payloads.

17. The bicycle electronic system of claim 16, wherein the at least one transmitter electronic component is further configured to:

receive, from said at least one receiver electronic component or from an electronic component of the bicycle electronic system that is distinct from the receiver electronic component and the at least one transmitter electronic component, a second payload as value of the or a further characteristic of the or a further BLE service, and extract from said payload a second plurality of basic-payloads.

18. The bicycle electronic system of claim 16, wherein the at least one receiver electronic component is further configured to:

form a second plurality of basic-payloads, each containing at least the unique identifier of a respective one of said attributable pieces of information, group together said second plurality of basic-payloads in a second payload, and transmit the second payload to said at least one transmitter electronic component or to an electronic component of the bicycle electronic system that is distinct from the receiver electronic component and the at least one transmitter electronic component as value of a characteristic of a BLE service.

* * * * *